(12) United States Patent
Lehmann

(10) Patent No.: US 9,315,344 B1
(45) Date of Patent: Apr. 19, 2016

(54) CONTAINER STACKING CONFIGURATIONS

(75) Inventor: Sebastian Lehmann, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/553,878

(22) Filed: Jul. 20, 2012

(51) Int. Cl.
G06F 7/00 (2006.01)
B65G 61/00 (2006.01)
B65G 47/90 (2006.01)
B07C 5/38 (2006.01)

(52) U.S. Cl.
CPC . B65G 61/00 (2013.01); B07C 5/38 (2013.01); B65G 47/90 (2013.01)

(58) Field of Classification Search
None
See application file for complete search history.

(56) References Cited

U.S. PATENT DOCUMENTS

| 5,430,831 | A | 7/1995 | Snellen |
| 6,721,762 | B1 | 4/2004 | Levine et al. |
| 6,889,893 | B2 | 5/2005 | Kent |
| 7,647,752 | B2 | 1/2010 | Magnell |
| 7,686,167 | B1 | 3/2010 | Stahl |
| 7,686,171 | B1 | 3/2010 | Shakes et al. |
| 7,747,543 | B1 | 6/2010 | Braumoeller et al. |
| 7,751,928 | B1 | 7/2010 | Antony et al. |
| 7,873,549 | B1 | 1/2011 | Mishra et al. |
| 7,979,359 | B1 | 7/2011 | Young et al. |
| 8,028,501 | B2 | 10/2011 | Buckley et al. |
| 8,086,344 | B1 | 12/2011 | Mishra et al. |
| 8,326,679 | B1 | 12/2012 | Rowe et al. |
| 8,340,812 | B1 | 12/2012 | Tian et al. |
| 8,401,975 | B1 | 3/2013 | Tian et al. |
| 8,560,406 | B1 | 10/2013 | Antony |
| 8,600,913 | B2 | 12/2013 | Williams et al. |
| 8,844,721 | B2 | 9/2014 | Archambault et al. |
| 2003/0035138 | A1 | 2/2003 | Schilling |
| 2003/0146272 | A1 | 8/2003 | Kent |
| 2003/0200111 | A1 | 10/2003 | Damji |
| 2004/0165980 | A1* | 8/2004 | Huang ............... B65G 47/90 414/799 |
| 2006/0257236 | A1* | 11/2006 | Stingel et al. ............. 414/791.6 |
| 2007/0021863 | A1 | 1/2007 | Mountz et al. |
| 2007/0112460 | A1 | 5/2007 | Kiselik |

(Continued)

FOREIGN PATENT DOCUMENTS

EP 0389985 10/1990
EP 2815367 12/2014

(Continued)

OTHER PUBLICATIONS

U.S. Appl. No. 13/131,153, filed Oct. 26, 2011, Doshi, et al., "Shipment Data for Optimized Box-Suite for Fulfillment Centers".

(Continued)

Primary Examiner — Yolanda Cumbess
(74) Attorney, Agent, or Firm — Athorus, PLLC

(57) ABSTRACT

The disclosure describes, in part, a system and method for improving the stacking of containers on or in a transportation unit. In some implementations, a stacking configuration may be planned that identifies containers and a position for those containers in the stacking configuration. The stacking configuration may be planned based on dimension values of the containers such that when stacked the stacking configuration remains stable. In addition, to improve the efficiency at which containers may be stacked, the disclosure describes that containers and/or the picking of items for those containers may be sequenced so that the containers, when packed and routed, arrive in a manner that allows efficient stacking.

21 Claims, 12 Drawing Sheets

(56) References Cited

U.S. PATENT DOCUMENTS

| | | | |
|---|---|---|---|
| 2008/0167884 | A1 | 7/2008 | Mountz et al. |
| 2010/0030354 | A1 | 2/2010 | Wiesel |
| 2010/0089781 | A1 | 4/2010 | Van Uum et al. |
| 2010/0108544 | A1 | 5/2010 | Biundo |
| 2010/0222915 | A1* | 9/2010 | Kuehnemann ......... B65G 57/00 700/217 |
| 2011/0031152 | A1 | 2/2011 | Petlak et al. |
| 2013/0197875 | A1 | 8/2013 | Shirley et al. |
| 2014/0067104 | A1 | 3/2014 | Osterhout |
| 2015/0005926 | A1 | 1/2015 | Pettersson |

FOREIGN PATENT DOCUMENTS

| | | |
|---|---|---|
| WO | WO2011072253 | 6/2011 |
| WO | WO2012018859 | 2/2012 |
| WO | WO2013122999 | 8/2013 |
| WO | WO2013142106 | 9/2013 |

OTHER PUBLICATIONS

U.S. Appl. No. 13/164,539, filed Jun. 20, 2011, Cholewinski, et al., "Inventory Distribution in a Hybrid Fulfillment Network".

U.S. Appl. No. 13/166,322, filed Jun. 22, 2011, Raff, et al., "Cost-Based Fulfillment Tie-Breaker".

U.S. Appl. No. 13/247,838, filed Sep. 28, 2011, Subramanian, et al., "Systems and Methods for Implementing Specialty Packaging in a Materials Handling Facility".

U.S. Appl. No. 13/398,602, filed Feb. 16, 2012, Lehmann, et al., "Container Selection in a Materials Handling Facility".

U.S. Appl. No. 13/429,257, filed Mar. 23, 2012, Clark, et al., "Custom Containers in a Materials Handling Facility".

Jackie Roembke, "From the Last Step Forward: GAR Products Takes its First Step by Revamping its Packaging Operations", "Wood Digest", Nov. 2007, pp. 2629, vol. 38, No. 11.

Jon E. Hilsenrath, "Beijiing Strikes Gold with U.S. Recycling", "The Asian Wall Street Journal", Apr. 9, 2003, Publisher: Dow Jones & Company Inc.

U.S. Appl. No. 13/281,497, filed Oct. 26, 2011, Doshi et al.

"Making a Manual Cost System Work for You: The First Step is to Put in Place a Formal Structure for Monitoring Costs," McDermott, John F., Dec. 1982, p. 40 vol. 64, No. 6, Publisher: Management Accounting.

"International Search Report and Written Opinion of PCT Application No. PCT/US2013/030086 with a mailing date of May 23, 2013."

"International Search Report and Written Opinion of PCT Application No. PCT/US2013/25865 with a mailing date of Apr. 23, 2013," Aug. 22, 2013.

Hapag-Lloyd, "Container Packing", 2010.

EP Search Report of EP Application No. 13763548 with a mailing date of Nov. 20, 2015.

* cited by examiner

CONTAINER STACKING CONFIGURATIONS

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

Common concerns with fulfilling items and/or groups of items involves optimizing the picking of items from a materials handling facility, ensuring that appropriate containers are used for shipping those items and optimizing the stacking of those containers for transport or storage within the materials handling facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
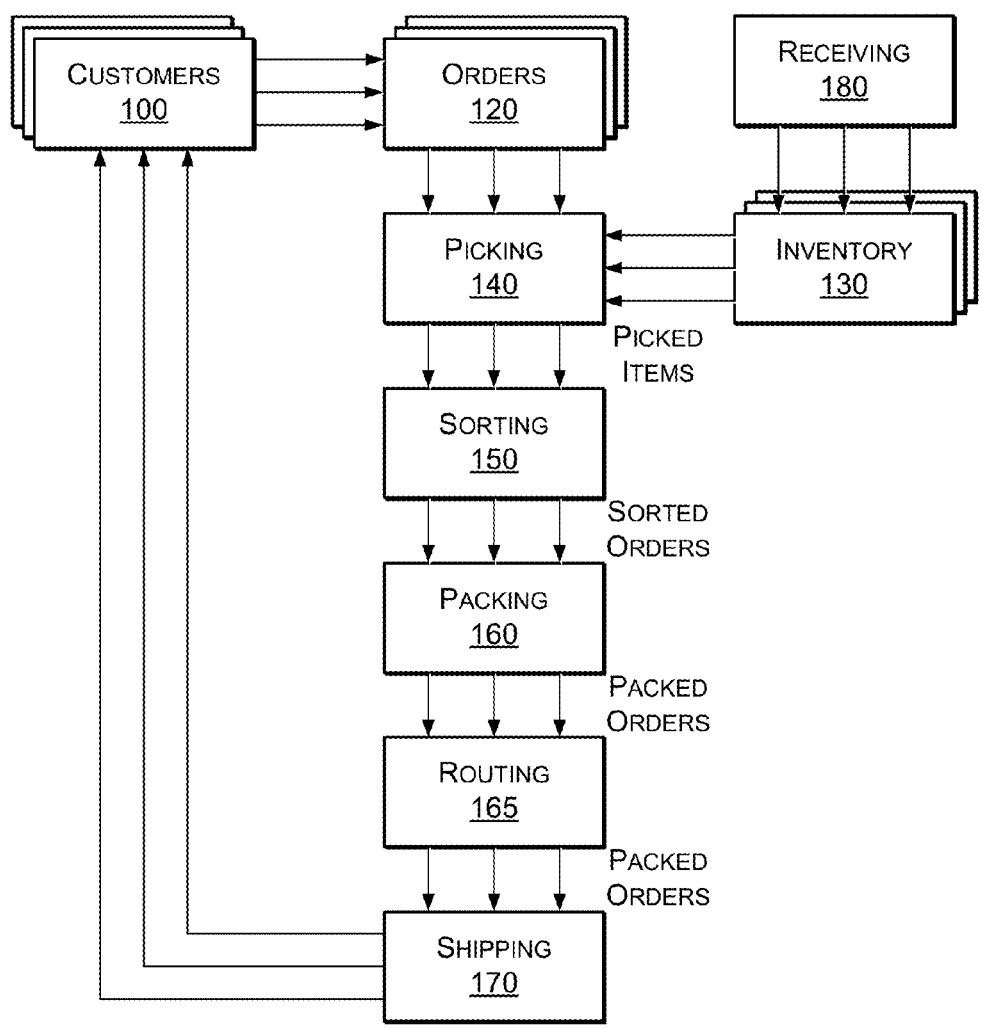
FIG. 1 illustrates a broad view of the operations of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A packaging information system configured to facilitate picking, packing and/or shipping operations may include various components used to facilitate efficient and/or cost-effective operations in a materials handling facility. For example, in various embodiments, a packaging information system may include a planning service, a product dimension estimator, a container recommendation service, one or more custom container forming devices (CCFD), and/or a stacking engine which may be utilized together or separately to facilitate efficient and/or cost-effective operations in the materials handling facility. For example, one or more of these components may be utilized to recommend a stacking configuration for stacking containers on a transportation unit for storage and/or shipping such that the stacking configuration is stable.

Planning a stable stacking configuration for containers increases the speed at which containers may be stacked for shipping, reduces labor time needed to re-plan and/or rearrange containers as they are stacked, reduces the likelihood of a stacking configuration collapsing or falling over, and reduces the damage to products during shipping. Improving stacking speed, improving stacking configuration stability, reducing labor from re-work/re-stacking and reducing product damage during shipping reduces shipping costs of items and provides a safer working environment within the materials handling facility. In addition, with a stable stacking configuration, the space utilization of the transportation unit is increased and the transportation unit may be able to hold and transport additional containers, again resulting in reduced shipping costs.

Without planning a stacking configuration for containers to be stacked on a transportation unit and instead just stacking containers as they arrive, the stacking agent will likely reach a point where the structural stability of the stacking configuration will not allow for additional containers and/or there remains no level surface large enough to support additional containers. The stacking agent must either stop stacking containers or take the time to remove and restack the containers, which results in additional labor and increased costs.

By planning a stacking configuration, containers may be stacked in a particular order that will increase the stability and allow additional containers to be added. For example, a materials handling facility may specify a maximum height to which containers may be stacked. A maximum height may be specified for safety reasons, due to the structural constraints with the materials handling facility (e.g., doorways), height of the transportation unit etc. Without a planned stacking configuration, stacked containers on a transportation unit may not reach the maximum height due to instability. However, with a planned stacking configuration, the stacking may be planned so that the containers remain stable and additional containers maybe added up to the specified maximum height.

In some implementations, a custom container may also be selected and the custom container dimension values adjusted to further improve the planned stacking configuration. For example, one or more dimension values may be increased such that when a custom container is placed in a stacking configuration, at least a portion of the stacking configuration will have a larger level surface (i.e., the custom container may be configured in a dimension such that when it is stacked it will be the same height as one or more other containers in the stacking configuration). By leveling a portion of the stacking configuration, a stable surface now exists onto which additional containers may be added.

In some implementations, a total shipment cost may be determined for each transportation unit as well as for each container (standard container or custom container) included in the stacking configuration of the transportation unit. The total shipment cost may include transportation costs, packaging material costs and labor costs to pick the items, pack the items and stack the containers.

By estimating the total shipment cost for a transportation unit and each of the containers, the packaging information system can determine the lowest total cost combination to deliver the item to the customer. For example, if the item to be shipped has dimensions of 30.0 inches×20.0 inches×15.5 inches, the packaging information system may select a standard container available at the materials handling facility that has dimensions of 35.0 inches×25.0 inches×20.0 inches—representing the smallest available standard container in the materials handling facility that is still large enough to handle the item to be shipped. However, when the standard container is placed on the stacking configuration, it may be 2.0 inches shorter than the adjacent container, resulting in an un-level surface for the next container. To resolve the difference, the packaging information system may determine that a custom container having custom container dimension values of 30.5 inches×20.5 inches×22.0 inches can be formed using a custom container forming device in the materials handling facility that will still contain the item and provide a level surface on the stacking configuration. As an alternative, the packaging information may also determine that a different standard container having dimension values of 40.0 inches×25.0 inches×23.0 inches could be used—which would result in the height different being one in higher than an adjacent container when stacked on the stacking configuration.

Based on those three options, the packing information system may determine that the transportation cost for the recommended standard container, referred to herein as standard container transportation cost, is $7.50, the transportation costs for the alternative standard container is $8.10 and the transportation cost for the custom container, referred to herein as custom container transportation cost, is also $7.50. This could be based on the volume of the respective containers, the total weight, or some other factor for determining transportation costs. Shipping costs may be determined based on volume, weight and/or any other factor. For example, shipping costs may be based on an expected weight of a container based on the volume. The weight may also be rounded up to the next pound. Due to the rounding and expected weight calculations, container dimension values may be adjusted without altering the transportation costs.

Even though the transportation cost remains unchanged between the recommended standard container and the custom container and there may be an added cost of using a custom container forming device, the per container labor cost of stacking the container and other containers on the transportation unit is reduced because the time to properly orient and stack all of the containers will be lower due to the level surface. Also, with the increased stability of the stacking configuration, additional containers may be added, thereby potentially further reducing the total transportation cost for the transportation unit and each of the stacked containers. As a result of the lower total transportation cost, the packaging information system may recommend that a custom container be used to pack the item, rather than using a standard container.

In some examples, a custom container may be formed using an EM6 or EM7-25 packaging machine available from Packsize® International LLC, a Box on Demand™ packaging machine, or manually formed by cutting a custom container from one or more blanks of corrugate in response to receiving custom container dimension values from the container recommendation service as part of a packing, storing or shipping operation.

In some embodiments, a container recommendation may also be dependent on the customer to whom the item is to be shipped, an applicable service level agreement, the destination of the item, the carrier selected for transporting the item, item affinity information, an indicator of the fragility of the item, the weight of the item, and/or an environmental constraint associated with the item (e.g., a restriction on the temperature and/or humidity at which the item should be held during transport). In addition, a container recommendation may also be based on ensuring a good customer experience. For example, a custom container may be selected, even if more costly, so that the item contained in the container fits well and the customer does not receive a container that is unnecessarily large, and filled with a large amount of dunnage.

As used herein, the term "item package" may refer to a single item to be stored, shipped, or otherwise handled in a container, alone, or to multiple items that have been grouped for shipping, storing or for any other operations within a materials handling facility, such as for storing in inventory or transporting to a packing or shipping station. The term "container" may refer to any dimensionally-constrained environment, such as crates, cases, bins, boxes, or any other apparatus capable of storing one or more items. In some embodiments, references to a "container" may refer to any dimensionally-constrained environment, including conventional containers (e.g., boxes, bins, and the like), portals (doorways, hatches, etc.) and dimensionally-constrained paths (chutes, tracks, conveyor belts, etc.). A "standard container," as used herein is any pre-formed container having standard, pre-defined dimensions. A "custom container," as used herein, is any container that is formed within a materials handling facility according to physical characteristics (e.g., length, width, height) associated with one or more items to be placed in the container and/or associated with the configuration of a stack of containers (stacking configuration). For example, the physical characteristics may be dimension values (e.g., length, width, height) associated with an item that is to be placed in the custom container for shipping and the custom container may be formed based on those provided dimension values, referred to herein as "custom container dimension values." In addition, the custom container dimension values may also include additional dimensions in one or more of the length, width or height that is associated with characteristics of a stacking configuration, into which the custom container will be added. For example, the height of a custom container may be increased such that when the custom container is formed and added to the stacking configuration the height of the custom container will match the height of one or more adjacent containers (custom or standard) of the stacking configuration. The term "transportation unit" may refer to any environment onto or into which items and/or containers may be stored or placed for conveying or transporting. For example, a transportation unit may be a pallet, truck, trolley, trailer, gaylord, partial-gaylord, rail-road car, etc.

For illustrative purposes, some examples of a packaging information system (and/or various components thereof) are discussed below in which particular item package and container parameters are analyzed in particular manners, and in which particular types of analyses and processing of parameters is performed. However, those skilled in the art will appreciate that the techniques described may be used in a wide variety of other situations, and that other implementations are not limited to the details of these examples.

A block diagram of a materials handling facility, which, in one embodiment, may be an order fulfillment facility configured to utilize various systems and methods described herein, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes receiving operations 180 for receiving shipments of stock from various vendors and storing the received stock in inventory 130. To fulfill the orders 120, the one or more items specified in each order may be retrieved or "picked" from inventory 130 (which may also be referred to as stock storage) in the order fulfillment facility, as indicated by picking operations 140. In some embodiments, the items in an order may be divided into multiple item packages (i.e., shipment sets) for fulfillment by a planning service before item package fulfillment instructions are generated (not shown).

In some implementations, the picking operations 140 may communicate with a central control system, and receive a sequence for which items of an item package should be picked and delivered to a sorting operation. The central control system, in some instances, may communicate with the stacking engine. The stacking engine may determine the sequence in which ordered items should be picked so that they will progress through picking operations 140, sorting operations 150 and packing operations 160 and arrive at a stack station within the shipping operations 170 in a manner that will facilitate stacking of the containers into which the items are packed according to a stacking configuration. The stacking configuration may be determined by a stacking engine such that the stacking configuration will be stable and potentially allow stacking of additional containers on the transportation unit.

The stacking engine may provide the picking and sorting sequence for items to the central control system, directly to the picking operations 140 and/or directly to the sorting operations 150, so that the ordered items may be picked and sorted according to the sequence specified by the stacking engine.

In this example, picked items may be delivered to one or more stations in the order fulfillment facility for sorting operations 150 into their respective orders or shipment sets and then transferred to one or more pack stations 160 for packing of the items into containers. The routing operations 165 may sort packed orders for routing to one of two or more stack stations within the shipping operations 170. At the stack stations, containers may be stacked onto or in a transportation unit according to a stacking configuration and shipped to the customers 100.

The package routing operations 165 may, in various embodiments, be automated or manual. The package routing operations 165 may communicate with the central control system and receive an indication of a stack station to which each packed order should be routed. The central control system, in some implementations, may communicate with the stacking engine. The stacking engine may determine a stack station for each packed order dependent on the destination of the container, the size of a container and/or the size of other containers allocated to the same stack station.

The stacking engine may provide an indication of the stack station to the central control system, and/or directly to the package routing operations 165, so that the packed order may be diverted to an appropriate stack station within shipping operations 170, as described herein. For example, the stacking engine may determine stacking configurations for multiple different transportation units, such as pallets, so that the stacks of containers are stable. When determining stacking configurations for multiple transportation units, the stacking engine may opportunistically route containers of various sizes to different stack stations for stacking onto the various transportation units. As discussed in more detail below, in some implementations, the stacking engine may include in the stacking configuration one or more custom containers with specified custom container dimension values that will enable the stacking engine to further improve the stability and overall structure of the stacking configuration.

Note that not every fulfillment facility may include both sorting and pack stations. In certain implementations, agents may transfer picked items directly to a pack station, while in other implementations agents may transfer picked items to a combination sort and pack station (not illustrated). This may result in a stream and/or batches of picked items for multiple incomplete or complete orders being delivered to a sort station for sorting operations 150 into their respective orders for packing and shipping, according to one implementation. In other implementations, items and/or containers may be routed directly to a shipping operations 170 and/or stacking stations from receiving operations 180.

Because portions of an order may be received at different times, sorting operations 150 and packing operations 160 may have to wait for one or more items of some orders to be delivered to the sort station(s) before processing of the orders completes. Likewise, if items arrive at sorting operations 150 out of the sequence specified by the stacking engine, those items may be held at sorting operations 150 until other items arrive before releasing the items to packing operations 160. Releasing items from the sorting operations 150 in the sequence provided by the stacking engine allows for items to be picked in parallel by multiple picking agents and delivered to sorting independent of one another without disrupting the sequence specified by the stacking engine. By restoring the sequence during sorting operations 150, the items will be delivered to the packing operations 160 and arrive at the stack stations in, or approximately in, the sequence specified by the stacking engine so that the containers holding the items can be stacked according to the planned stacking configuration.

In implementations with multiple pack stations in the packing operations 160, items may be packed and delivered to routing operations out of sequence due to the different speeds at which the pack stations may pack the items and/or if the items were not sequenced during sorting operations 150. In such an instance, the routing operations 165 may include a buffer, such as a loop conveyor belt, that can be used to temporally hold packed items before delivery to a stack station. For example, as packed items are provided from packing operations 160 to routing operations 165, they may remain on a loop conveyor belt, or other temporary holding zone, and be released to the shipping operations in the sequence order specified by the stacking engine.

In another implementation, routing operations 165 may include multiple buffers, such as multiple loop conveyor belts, a loop conveyor belt and a temporary holding zone, etc.

For example, some items may be buffered in a temporary holding zone, and stacked according to a stacking configuration, while other items are buffered in a loop conveyor belt. Items may then be released from either the loop conveyor belt or the temporary holding zone in the sequence order specified by the stacking engine. In some instances, items may be released to shipping operations 170 from the loop conveyor belt according to the sequence and items in the temporary holding zone that will soon be released according to the sequence may be transitioned to the loop conveyor belt.

In another implementation, the sequence may be batched so that more than one container may be released to the shipping operations 170 at a time. For example, if the sequence specified by the stacking engine includes nine containers, the sequence may be batched such that the containers are released from routing operations 165 to shipping operations 170 in batches of three (containers 1-3 in the first batch, containers 4-6 in the second batch and containers 7-9 in the third batch). Within the batch, the order in which the containers are released may not matter. For example, containers 1-3 of the first batch may be released to shipping operations such that container 2 arrives first, followed by container 1 and then by container 3. By releasing in batches, the stacking agent can stack the containers according to the stacking configuration provided by the stacking engine without having to set multiple containers aside until the appropriate container(s) arrive.

In another implementation, the containers may be released from routing operations 165 as they arrive, and if needed, buffered or otherwise placed in a temporary holding zone within the shipping operations 170 until they are stacked according to the stacking configuration provided by the stacking engine. For example, the containers may be received at a stack station and either placed on a transportation unit according to the stacking configuration or placed in a temporary holding zone until they are ready to be added to the stacking configuration.

Note that a picked, packed and shipped item package does not necessarily include all of the items ordered by the customer; a shipped item package may include only a subset of the ordered items available to ship at one time from one fulfillment facility. Also note that the various operations of an order fulfillment facility may be located in one building or facility, or alternatively may be spread or subdivided across two or more buildings or facilities.

A stacking engine (which may plan stacking configurations for transportation units that include standard containers, custom containers, or both standard containers and custom containers), as described herein in various implementations, may also be utilized in a number of different facilities and situations, including, but not limited to, materials handling facilities, order fulfillment centers, rental centers, retailers, distribution centers, packaging facilities, shipping facilities, libraries, museums, warehouse storage facilities, and the like. Note that the arrangement and order of operations illustrated by FIG. 1 is merely one example of many possible embodiments of the operations of an order fulfillment facility utilizing a stacking engine. Other types of materials handling, manufacturing, or order fulfillment facilities may include different, fewer, or additional operations and resources, according to different implementations. For example, in some implementations, one or more custom container forming devices may be utilized at receiving 180 such that received stock is packed in a custom container prior to placement in inventory. In such an example, rather than routing the inventory item to packing operations 160, the item can be picked and transferred directly to shipping operations 170 because it has already been packaged at receiving 180.

The items in a materials handling facility may be of varying shapes, sizes, and weight. For example, some items in a materials handling facility may be irregularly shaped. To facilitate container recommendation and/or more efficient shipping, irregularly shaped items may be handled in boxes or other regularly shaped packaging, which may make stacking of such items possible. In other embodiments, irregularly shaped items may be handled without placing them in regularly shaped packaging. According to various embodiments, automated product dimension estimation and/or correction may be utilized with any regularly shaped or irregularly shaped items.

Figure 2:
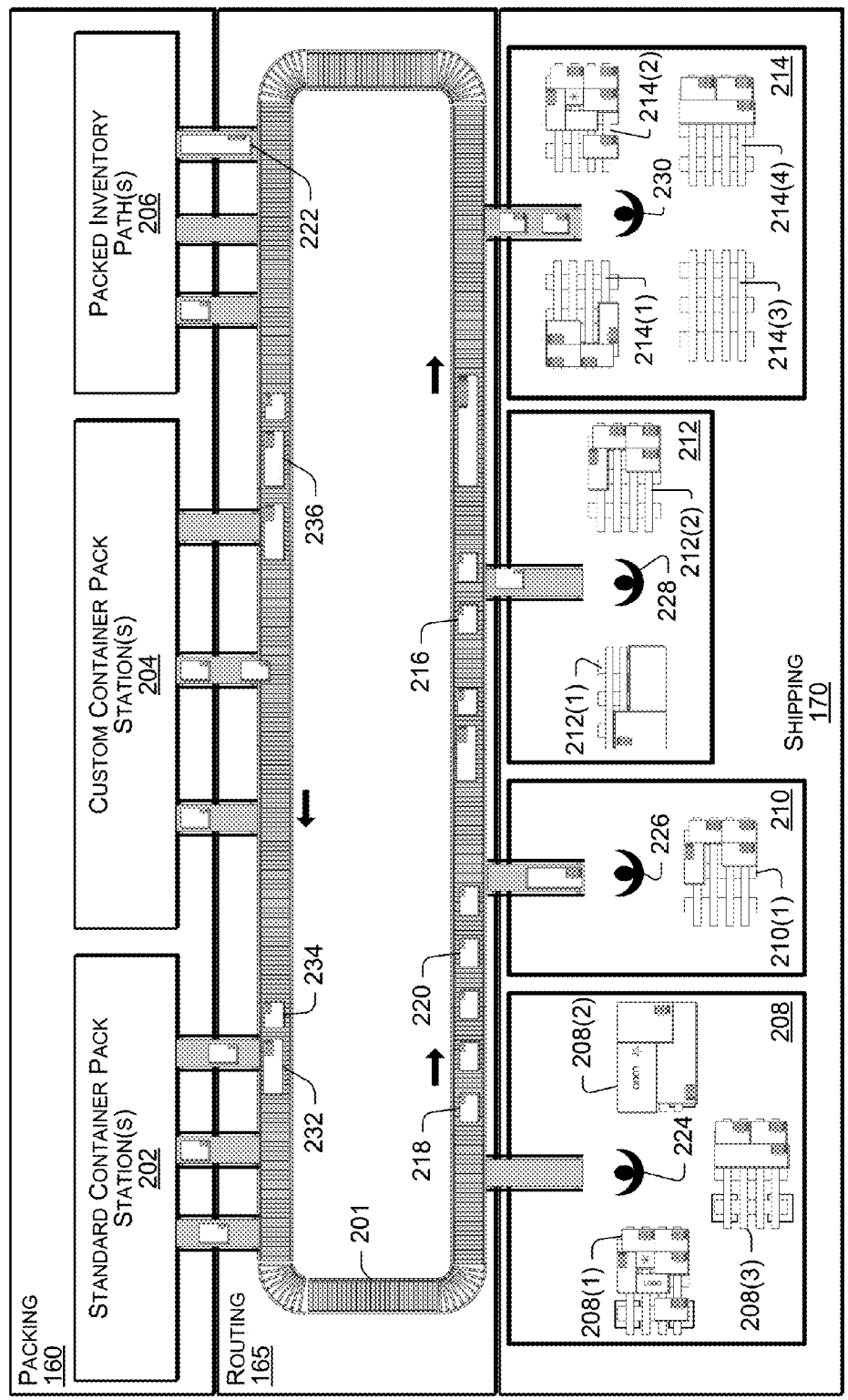
FIG. 2 illustrates an additional view of the packing, routing and shipping operations of a materials handling facility, in one implementation.

FIG. 2 illustrates a partial view of a materials handling facility, including the packing operations 160, routing operations 165 and the shipping operations 170, in one implementation. As shown in FIG. 2, packing operations 160 may include one or more standard pack stations 202 and one or more custom pack stations 204. In some implementations, there may also be a packed inventory path 206 for inventory that is pre-packed for shipping that can be routed directly from inventory 130 to shipping operations 170.

If an item package is routed to a standard pack station 202 a container recommendation service may recommend to a packing agent at the standard pack station 202 a standard container into which the item package should be packed. If an item package is routed to a custom pack station, the container recommendation service may provide custom container dimension values for use in forming a custom container into which the item package is to be packed.

In some implementations, custom container forming devices may be integrated with and part of the custom pack stations 204. In other implementations, the custom container forming devices may be separate from the custom pack stations 204 and formed custom containers routed from the custom container forming devices to custom pack stations 204 so that the item packages can be packed in the formed custom containers.

Items that are packed in containers (custom or standard) prior to storage may subsequently be packed again inside either another custom container or a standard container. For example, if an item is packed in a custom container at receive 180 and placed into stock inventory, it may subsequently become part of a larger order of multiple items that are picked and packed together in either another custom container or in a standard container for shipping to a customer.

As item packages are packed at one or more of the standard pack stations 202 or custom pack stations 204, the containers (standard or custom) containing those item packages are released to the routing operations 165. In one implementation, the containers in routing operations 165 may be routed to a stack station 208, 210, 212, 214 for stacking onto a transportation unit according to a stacking configuration provided by the stacking engine. While the shipping operations 170 illustrated in FIG. 2 includes four stack stations, any number of stack stations may be utilized with the implementations described herein.

Each stack station 208, 210, 212, 214 may include one or more transportation units onto or into which containers may be stacked according to a planned stacking configuration. For example, stack station 208 includes three transportation units 208(1), 208(2), 208(3) onto which containers may be stacked. Stack station 210 includes a single transportation unit 210(1). Stack station 212 includes two transportation units 212(1), 212(2) and stack station 214 includes four transportation units 212(1), 212(2), 212(3), 212(4). Any number and type of transportation unit may be utilized at a stack station. As discussed further below, one or more transportation units may further be divided into stack quadrants and a stacking configuration planned for each stack quadrant.

In the example of FIG. 2, as containers are sent from the packing operations 160 to routing operations 165, the stacking engine receives an identification of the container, a container location within routing, the container dimension values and a destination for the container. The destination may be the ultimate customer destination, another materials handling facility or any location to which the container will be delivered once it departs the materials handling facility. For example, containers for orders from individuals located on the United States West Coast who are shipping from a materials handling facility in Kentucky may all have a destination of a carrier's material handling facility in Denver, Colo.

Based on the containers in routing operations 165, the location of those containers in routing operations 165, the dimension values of those containers and/or the destinations of those containers, the stacking engine may plan stacking configurations for each of the transportation units 208(1)-208(3), 210(1), 212(1)-212(2), 214(1)-214(4) and provide instructions to the routing operations 165 to route containers to corresponding stack stations 208, 210, 212, 214. The routing instructions provided to routing operations 165 may identify the container and the stack station 208, 210, 212, 214 that is to receive the container. In some implementations, the routing instructions may also include a sequence in which the containers are to be delivered to each stack station. Generally, the only constraint for routing instructions is that containers allocated for stacking onto the same transportation unit have the same destination (which may be another materials handling facility or other location before the container reaches the customer that ordered the packed item).

The routing operations 165, upon receiving routing instructions from the stacking engine, may route the containers to the designated stack stations. Routing of containers may be manual, automated, or a combination of manual and automated. In the implementation illustrated in FIG. 2, the containers are automatically routed from the packing operations 160 to shipping operations 170 using a conveyor belt 201. In this example, if the routing instructions also include sequence information, a container may not be released from the conveyor belt 201 into shipping operations 170 until other containers prior to it in the sequence have been released into shipping operations 170. For example, if the routing instructions identify that containers 216, 218 and 220 are all to be routed to stack station 214 in that same order, container 216 may be released into stack station 214 as it passes that location, but container 220 may not be released when it first passes stack station 214 because it is ahead of container 218.

In the illustrated example, the conveyor belt 201 acts as a temporary holding zone within routing operations 165 used to sequence delivery of containers to the appropriate stack station 208, 210, 212, 214. Other forms of routing and/or temporary holding zones may be utilized with various implementations. For example, routing may be done manually and containers stacked or temporarily stored within routing operations 165 and manually provided to stack stations 208, 210, 212, 214 according to the routing instructions. In other implementations, one or more automated robotic drive units (bots), such as those offered by Kiva Systems, may be utilized to route one or more containers to stack stations within the shipping operations 170.

In addition, temporary holding zone(s) may also be implemented at the packing operations 160 or routing operations 165. In addition to manually storing items or utilizing a conveyor belt to temporarily hold items, in some implementations a storage wall may be utilized to temporarily store one or more containers prior to routing, or post routing but prior to delivery to a stack station. Likewise, as discussed below, items may be temporarily placed in a temporary holding zone once they reach the stack station, rather than during picking, packing and/or routing.

Returning to the example of FIG. 2, once a container is provided into routing operations 165, the stacking engine may identify that container, plan and/or adjust planned stacking configurations for each transportation unit. For example, even though a stacking configuration has been planned for transportation unit 214(4) that includes containers 216, 218, 220, the stacking engine may identify container 222 as it is received into routing operations 165 and re-plan the stacking configuration to include container 222. Generally, re-planning of a stacking configuration may be done for any planned container—a container that is not yet stacked on the transportation unit according to the planned stacking configuration.

In this example, container 222 is an odd shape and the stacking engine may determine that transportation unit 214(4) is scheduled for the same destination as container 222, is early in stacking (only three other containers are stacked) and re-plan the stacking configuration such that container 222 can be included in the stacking configuration without disrupting the stability of the stacking configuration. This re-planning of the stacking configuration may include assigning container 222 for placement in the stacking configuration to occur prior to stacking of containers 216, 218, 220, or container 222 may replace one or more of containers 216, 218, 220. In the event that one or more of the assigned containers 216, 218, 220 is replaced, the stacking engine may assign the one or more containers to a stacking configuration of another transportation unit for the same destination.

In other implementations, re-planning may occur if one of the containers planned for the stacking configuration is removed. For example, even though a stacking configuration has been planned for transportation unit 214(4) that includes containers 216, 218, 220, container 216 may be removed from routing operations 165. A container may be removed for a variety of reasons. For example, it may be determined that the expected weight of the container and the actual weight of the container do not match, the container or its contents may be damaged, etc. In such an example, the stacking configuration may be re-planned to exclude container 216. While this example, discusses the removal of a container during routing operations 165, a container may also be removed during packing operations 160 or shipping operations 170 and the stacking configuration may be re-planned.

In some implementations, when planning stacking configurations, the stacking engine may consider the containers in routing operations 165, standard containers that are being packed at one or more standard pack stations 202, custom containers that are formed and being packed at a custom container pack station 204, items that are at, or are arriving at a custom container pack station 204 for which a custom container is to be formed and/or items that have been ordered and are in the process of being picked.

As discussed further below, custom container dimension values for one or more custom containers may be modified to improve the stacking configuration for a transportation unit. For example, one or more custom container dimension values may be modified so that when the custom container is added to the stacking configuration on a transportation unit, the height (or other dimension) of the custom container matches the height (or other dimension) of another container in the stacking configuration.

For example, in planning the stacking configuration for transportation unit 208(2), which already includes eight stacked containers, the stacking engine may identify that containers 232, 234, 236 in routing operations 165 are to be added to the stacking configuration but that the stacking configuration would be more stable if there was an additional container with a height dimension of 35.0 inches, a width dimension between 10.0 inches and 15.0 inches, and a length dimension between 22.0 inches and 25.0 inches included in the stacking configuration. In this example, the fixed height dimension is considered the priority dimension, as the stacking engine has determined that the desired height for the additional container is 35.0 inches. The width and length, considered non-priority dimensions in this example, may be up to the dimension values of 15.0 inches and 25.0 inches, respectively. The lower bounds for the width and length dimension values may be considered to limit gaps between packages in the stacking configuration. In other implementations, the lower bounds for the non-priority dimension values may be omitted and only maximum dimension values considered.

Based on the desired priority and non-priority dimension values, the stacking engine may identify an item package at a custom container pack station 204 that currently has an associated custom container that when formed will have dimension values of 14.5 inches×23 inches×33 inches. This item package may be selected and the custom container dimension values modified such that when the custom container is formed, it will have dimension values of 14.5 inches×23.0 inches×35.0 inches to provide a container for use in the stacking configuration that has the priority dimension value desired. In this example, only the priority dimension value is modified. In other examples, one or more of the non-priority dimension values may also be modified. Likewise, while in this example only one priority dimension value is desired, in other examples two of the dimension values may be considered priority dimension values, or all three dimension values may be considered priority dimension values.

In still another example, if there is no item package for which a custom container is to be formed that will have dimension values matching desired priority dimension value(s), an empty custom container may be formed that itself has the desired priority dimension value(s) or when stacked with another container (custom or standard) together provide the priority dimension value(s) for the stacking configuration. For example, if the priority dimension value is a height value of 35.0 inches but there are no item packages at or near the custom container pack station 206 for which custom container dimension values can be modified to provide 35.0 inches height, an empty custom container may be formed for use in obtaining the priority dimension value. For example, if there is a container (standard or custom) in routing operations 165 with dimension values of 15.0 inches×23.0 inches by 32.0 inches, an empty custom container may be formed with dimension values of 15.0 inches×23.0 inches×3.0 inches. The stacking engine may then plan the stacking configuration so that the two containers (the container in routing operations 165 and the empty custom container) will be stacked together to provide combined dimension values of 15.0 inches×23.0 inches by 35.0 inches. The empty custom container may be identified so that it can be handled properly during shipping. For example, the empty custom container may be identified as a non-essential container, spacing container, etc. so that when the containers of the stacking configuration are separated during transport (e.g., for final delivery to customers) the empty custom container can be identified and removed.

Figure 3:
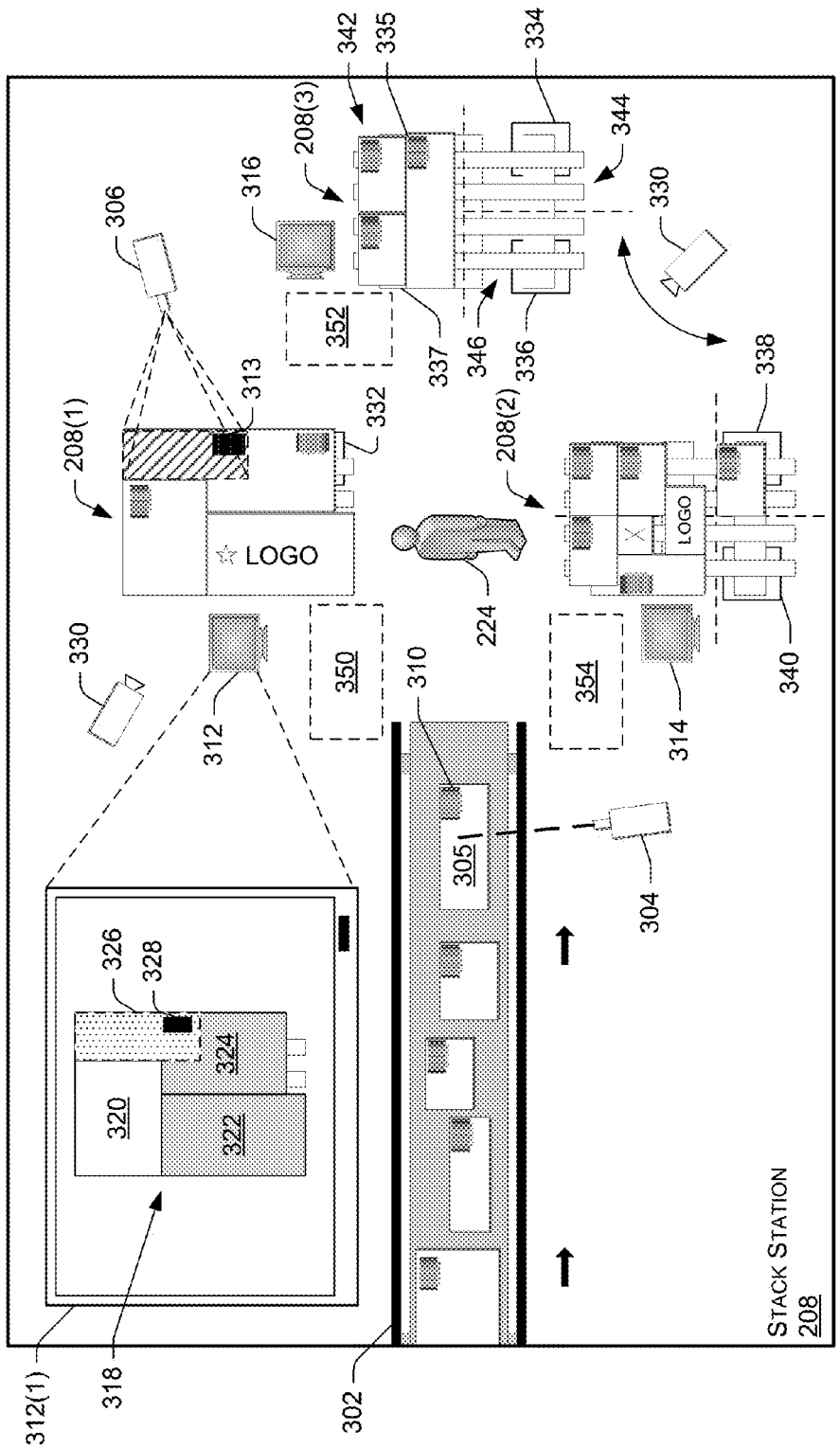
FIG. 3 illustrates a broad view of the stack station within a materials handling facility, in one implementation.

As discussed below, the stacking engine may also communicate with one or more stacking agents 224, 226, 228, 230 at each stack station 208, 210, 212, 214 identifying the container to be stacked, the transportation unit onto which the container is to be stacked, the orientation of the container, the rotation of the container (which side goes up) and the location on the transportation unit where the container is to be stacked. As used herein, orientation, rotation and location of a container may be generally referred to as a position of the container. For example, FIG. 3 provides a more detailed illustration of stack station 208. Stack station 208 includes a stacking agent 224 and three transportation units 208(1), 208(2), 208(3). Containers may be provided into the stack station 208 from routing operations 165 via one or more conveyor belts 302. The convey belt 302 may also be used as a buffer. As noted above, other techniques, automated and/or manual, may be used to provide containers to stack stations.

In this example, as containers arrive at the stack station 208, the stacking engine may identify to the stacking agent 224 the next container to be stacked. For example, a projection device 304 may be used to visually identify or highlight to the agent the next container to be stacked. The projection device may be any type of light emitting component, such as a standard projector, light emitting diode, laser, etc. In the illustrated example, the projection device 304 is identifying to the stacking agent 224 that container 305 is the next container to be stacked on a transportation unit.

In addition to identifying the container 305 to be stacked, the stacking engine may identify the transportation unit 208(1) onto which the container is to be stacked as well as the position for the container. In some implementations, transportation units may be divided into multiple quadrants and stacking configurations determined for each quadrant. In other implementations, transportation units may be stacked as a single quadrant. In still other implementations, quadrants may be altered as the transportation unit is stacked. For example, the transportation unit may begin as a single quadrant and multiple layers stacked. During stacking, the stacking engine may modify the quadrants dividing the transportation unit into multiple quadrants for further stacking. Generally, quadrants may be determined based on the dimension values of the containers to be stacked for the destination and to ensure that the stacking configuration on the transportation unit remains stable.

In some implementations, rather than the transportation units remaining stationary at a stack station until completed, automated robotic drive units may be used to deliver and remove the transportation units to and from the stack stations. For example, when the next container to stack is identified, the stacking engine may instruct that the corresponding transportation unit be delivered to the stack station so the container can be stacked. In addition, position information may also be provided so the robotic drive unit can orient the transportation unit so the side on which the container is to be stacked is closest to the stacking agent.

In addition to stacking containers on or in transportation units based on planned stacking configurations for one or more quadrants, the stacking of transportation units may be staggered. For example, the stacking engine may plan the arrival of containers for stack station 208 such that the stacking of containers on transportation units 208(1)-208(3) complete at different times. For example, containers may arrive so that transportation unit 208(1) may complete first, followed by transportation unit 208(2), then transportation unit 208(3). By staggering completion of transportation units 208(1)-208(3), the stacking agent 224 may continually have at least one transportation unit available for stacking containers. In this example, when transportation unit 208(1) is completely stacked it may be removed from the stack station 208 and replaced with another transportation unit while the stacking agent 224 continues stacking the other two transportation units 208(2)-208(3).

In one example, a projection device 306 may project an image of the container at the desired position on the transportation unit 208(1). To further aid the stacking agent 224 in placing the container on the transportation unit 208(1), an identifier or other element may be included on the containers and projected by the projection device 306 to assist the stacking agent in identifying which side of the container is to face up. For example, the packing slip, bar code 310, or other identifier may be included at a specific location on each container (e.g., top right) and the projection device 306 may project a representation identifying the intended location of the identifier. In some implementations, multiple identifiers of different shapes and/or sizes may be included on one or more sides of the containers and the projection device 306 may project the desired shape/size identifier 313 to aid the stacking agent in placing the container appropriately on the transportation unit. In another implementation, multiple projection devices may be used to project a virtual three-dimensional representation of the container at the desired position on the transportation unit.

In another implementation, a display 312, 314, 316 may be used to provide stacking configuration information to the stacking agent 224. The display 312, 314, 316 may be any type of display that can be used to provide two-dimensional and or three-dimensional representations of objects to the stacking agent 224. In one example, as illustrated by the expanded view 312(1) of the display 312, a top down two-dimensional view of the stacking configuration 318 may be provided. Representations of top-level stacked container 320 may be visually distinguished from representations of lower-level stacked containers 322, 324. In addition, the position of the planned container 326 to be stacked on the transportation unit may be visually represented and distinguished from the representations of the stacked containers. In some implementations, the visual representation of the planned container 326 may be highlighted, flashing or otherwise distinguished from the visual representations of stacked containers. In addition, a visual representation of an identifier 328 may be displayed to aid the stacking agent in placing the planned container on the transportation unit so that it is oriented and rotated properly (the container is turned the correct way with the correct side if facing up). In some implementations, the display 312, 314, 316 may also, or as an alternative, provide text-based instructions for stacking the containers according to a stacking configuration.

In some implementations, stacking configuration information may be audibly provided to the stacking agent 224. For example, a transportation unit may be position according to north, south, east and west and the stacking agent 224 may receive audible instructions via an audio output device to place a container in, for example, the north-east quadrant with the bar code identifier facing up and in the north-east position.

The stacking engine may also verify that the appropriate container has been placed in the correct position on the transportation unit. For example, an image capture device 330 (e.g., camera) may be used to visually confirm that the appropriate container has been placed correctly on the transportation unit 208(1). The image capture device 330 may capture one or more images of the stacking configuration and/or the added container and perform optical character recognition (OCR) to identify the container based, for example, on the shipping label and/or bar code to confirm that the appropriate container has been placed on the transportation unit. In addition, object analysis may be performed on the image to confirm that the container is positioned properly. As an alternative or in addition thereto, the stacking agent 224 may utilize a bar code scanner and scan a bar code on the container to confirm the container identity as it is placed on the transportation unit.

In some implementations, one or more scales 332, 334, 335, 336, 337, 338, 340 may be included underneath the transportation units for use in verifying the identity of the stacked container and to confirm that the container has been placed on the transportation unit in the appropriate stack quadrant, and possibly with the correct position. For example, the weight of the container may be known and when added to the transportation unit, the added weight may be determined to confirm that the appropriate container has been added. In addition, if multiple scales 332, 334, 335, 336, 337, 338, 340 are used under the different corners of the transportation units the quadrant into which the container is placed may be determined. For example, if the transportation unit 208(3) has four corners and each corner rests on a scale 334, 335, 336, 337, the transportation unit 208(3) may be divided into one, two, three or four quadrants. When a container is added, the weight difference across the four scales may be computed and a determination made identifying into which quadrant the container was placed and possibly to determine whether the container has been properly positioned. For example, transportation unit 208(3) is divided into three quadrants 342, 344, 346. The first quadrant 342 is associated with scales 335, 337, the second quadrant 344 is associated with scale 334 and the third quadrant 346 is associated with scale 336. If a container is added to quadrant three, the weight difference between the four scales may be compared and a determination can be made that the container has been placed in the third quadrant.

Many other techniques may be used to verify that the appropriate container has been placed onto the transportation unit at the correct position beyond those discussed above. For example, one or more Radio Frequency Identifiers (RFID) may be included in or on the containers for us in identifying the containers. Alternatively, an image of a side view of the stacking configuration may be taken against a contrasting background (e.g., white background) and used to determine if the container has been properly positioned.

If the container is improperly placed, or if the wrong container is placed on the transportation unit, the stacking engine may notify the stacking agent 224 and provide guidance to correct the misplacement. In addition, the conveyor belt 302 may be slowed down to provide additional time for the stacking agent to remedy the misplacement of the container.

In some implementations, the stacking engine may also utilize the image capture device(s) 330 and/or scales to identify containers that do not match the intended dimensions or weights. For example, the camera 330 may identify that a container, even though properly placed and oriented on the transportation unit, is larger than the expected dimension values. In such an event, the stacking engine may notify the stacking agent 224 of the discrepancy and instruct the stacking agent to remove and/or reposition the container and/or the stacking engine may re-plan the stacking configuration for that transportation unit based on the actual dimension values of the container. In another example, the stacking agent 224 may provide feedback that the container does not match the expected dimensions or does not fit in the planned position within the stacking configuration. In this example, the stacking agent 224 may provide corrected information as to the containers dimensions (or the stacking agent may otherwise determine those dimensions) and the stacking engine may re-plan the stacking configuration for that transportation unit based on the actual dimension values of the container. The re-planned stacking configuration may include the container with the updated dimension values or exclude the container and provide instructions to put the container in a temporary holding zone.

The stack station 208 may also include one or more temporary holding zones 350, 352, 354 for use in temporarily holding one or more containers. For example, if the stacking configuration for a transportation unit has not yet received containers onto which the next container on the conveyor belt is to be stacked, the stacking engine may identify the container and instruct the stacking agent 224 to place the container in the temporary holding zone 350, 352, 354 that corresponds with the transportation unit onto or into which the container will be stacked. When the stacking configuration is ready for a container located in the temporary holding zone, the stacking engine may use the projection device 304 to identify the container as the next container for stacking on the transportation unit and identify the location of the container for stacking using the projection device 306 or display 312. In addition, the conveyor may be slowed down to allow time for the stacking agent 224 to stack the container previously located in the temporary holding zone.

Figure 4:
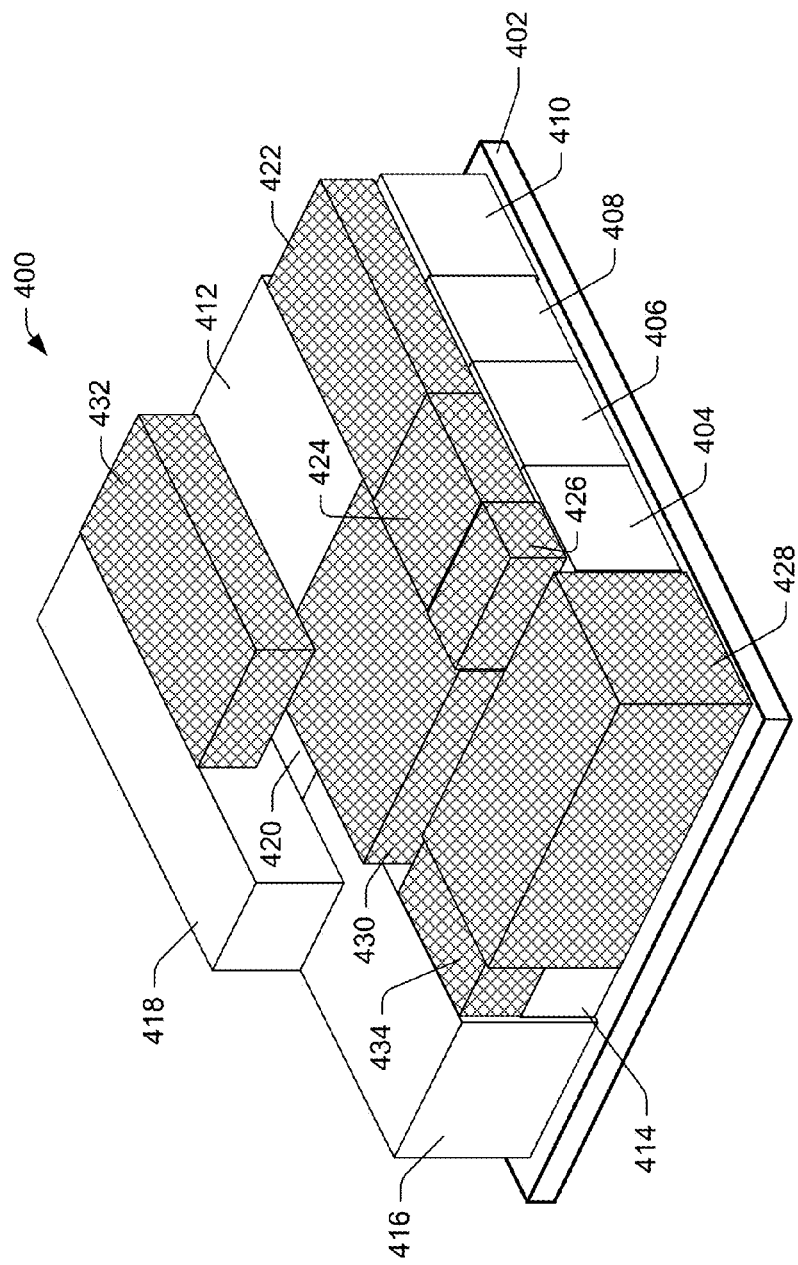
FIG. 4 is a block diagram of a stacking configuration, in one implementation.

FIG. 4 is a block diagram of a stacking configuration 400 situated on a transportation unit 402, in one implementation. In this example, stacked containers 404, 406, 408, 410, 412, 414, 416, 418, 420, represented as non-shaded blocks, are containers that have already been placed on the transportation unit 402 according to a stacking configuration. Planned containers 422, 424, 426, 428, 430, 432, 434, represented by the cross-hatched blocks, are containers that that have not yet been stacked on the transportation unit but have been planned for stacking at the respective positions in the stacking configuration for the transportation unit 402. The stacked containers 404, 406, 408, 410, 412, 414, 416, 418, 420 and/or the planned containers 422, 424, 426, 428, 430, 432, 434 may be standard containers, custom containers or a combination of both standard containers and custom containers.

As illustrated in FIG. 4, for some of the planned containers there is a sequence to which they need to be added to the stacking configuration. For example, planned container 430 needs to be added to the stacking configuration 400 before planned container 432. However, other planned containers may be added in any order with respect to each other. For example, planned containers 422, 424, 426, 428 and 434 may be added to the transportation unit 400 independent of one another. For planned containers that need to be added in sequence with respect to one another, they may be sequenced at picking, sorting, packing and/or stacking, as discussed above.

As also illustrated by the stacking configuration 400, the stacking engine may plan placement of containers to generate level surface areas for the next layer of containers. For example, planned container 432 has been selected and has dimension values so that when placed on the stacking configuration 400 its top surface will be level with the top surface of stacked container 418, thereby providing a larger, level surface area onto which another layer of containers may be stacked. Likewise, planned containers 422, 424, 426, 430 have been selected and arranged adjacent to stacked container 412 to provide a larger, level surface area that can be used for additional layers of containers. To provide this configuration, planned container 426 may not include an item package. Instead, its formation was instructed by the stacking engine for placement adjacent to planned containers 424, 430 to provide a larger, level top layer surface. Likewise, the height of planned container 428 may have been increased to match the height of planned container 434 and stacked container 416.

In some embodiments, standards or policies may be considered in planning a stacking configuration, such as a default placement for certain containers or a specific stacking algorithm to be assumed when recommending containers and/or estimating the volumetric utilization of container or group of containers if placed in a particular stack quadrant. For example, various policies may specify that the largest (and/or heaviest) containers in a group should be placed horizontally along the bottom of the transportation unit and smaller items placed on top of the larger items. In other examples, policies may specify that the largest (and/or heavies) containers in a group be placed in one stack quadrant of a transportation unit and smaller containers be placed in another stack quadrant. Other policies may also specify a maximum height for a stacking configuration based on, for example, the type of transportation unit.

Providing larger, level surface areas onto which additional containers may be stacked helps improve stability of the stacking configuration and allows for additional containers to be stacked. As can be appreciated, multiple configurations may be made with containers and the illustration provided with FIG. 4 is only one example.

Figure 5:
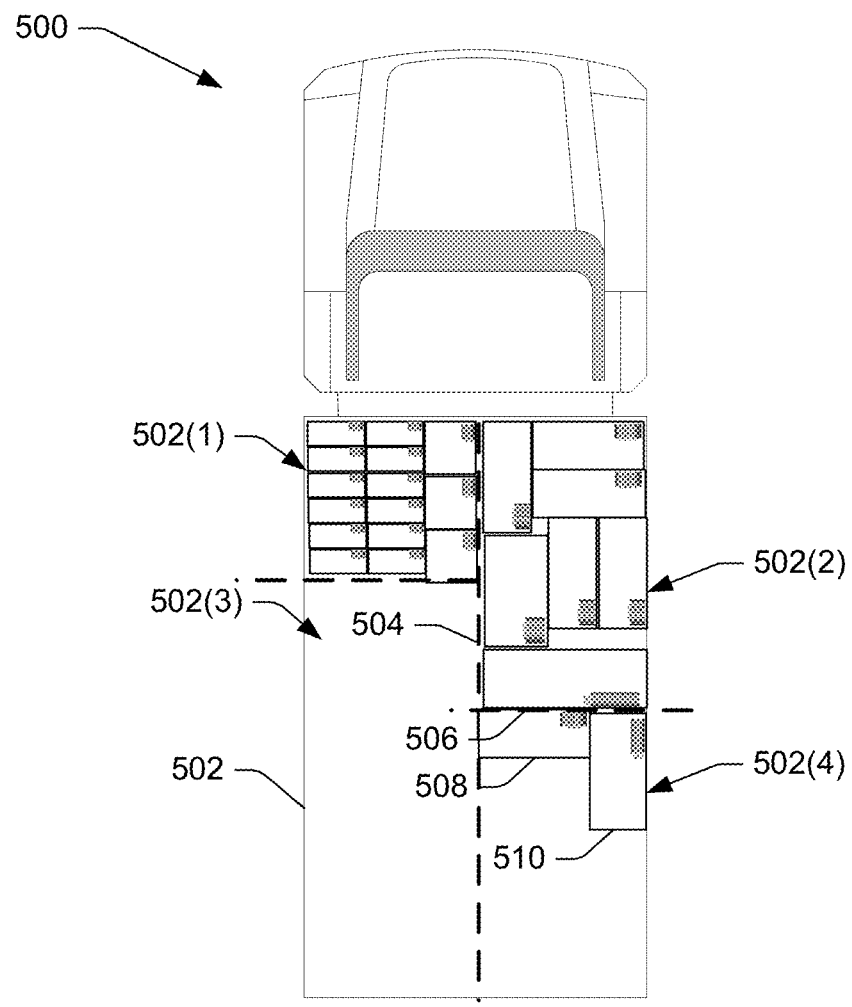
FIG. 5 illustrates a broad view of multiple stack quadrants within a transportation unit, in one implementation.

FIG. 5 illustrates a broad view of multiple stack quadrants within a transportation unit 502, in one implementation. In the example illustrated in FIG. 5, the transportation unit 502 is a trailer of a truck 500 into which containers are stacked. Similar to the transportation units discussed above with respect to FIGS. 2-4, the transportation unit 502 may be segmented into one or more stack quadrants, such completed stack quadrant I 502(1), completed stack quadrant II 502(2), active stack quadrant III 502(3) and active stack quadrant IV 502(4). Stack quadrants within a transportation unit 502 may be dynamically changed or pre-segmented. There may be fewer or more stack quadrants than the stack quadrants 502(1)-502(4) illustrated in FIG. 5 and the quadrants may be of similar or different sizes. Likewise, the stacking configuration for each stack quadrant may be pre-planned or planned as items and containers are picked, sorted packed and routed through picking operations 140, sorting operations 150, packing 160, routing operations 165 and shipping operations 170.

In some implementations, when planning a stacking configuration within a transportation unit with bounding dimensions (e.g., walls and a ceiling), additional factors may be considered. In the example illustrated in FIG. 5, at most two sides of a stack quadrant are accessible to a stacking agent. Only one side of stack quadrant I 502(1) is accessible to the stacking agent as the other sides are constrained by the sides of the trailer. Two sides of stack quadrant II 502(2) are partially accessible to the stacking agent. In this example, part of the interior side 504 of stack quadrant II 502(2) is obstructed by the stacked containers of stack quadrant I 502(1) and the portion of the rear side 506 of stack quadrant II 502(2) is partially obscured by the stacked containers 508, 510 of stack quadrant IV 502(4). Because access to stack quadrants in a transportation unit such as the trailer 502 can be obstructed by the sides of the transportation unit and/or stacked containers in other stack quadrants, the stacking engine may plan arrival of the containers so the quadrants are stacked in a logical manner, from floor to ceiling, before stacking within a quadrant that would hinder or otherwise prohibit access to an active stack quadrant. For example, stack quadrant I 502(1) and stack quadrant II 502(2) may both be stacked in parallel, but stack quadrant III 502(3) may not begin unit all containers planned for stack quadrant I 502(1) have been stacked.

Figure 6:
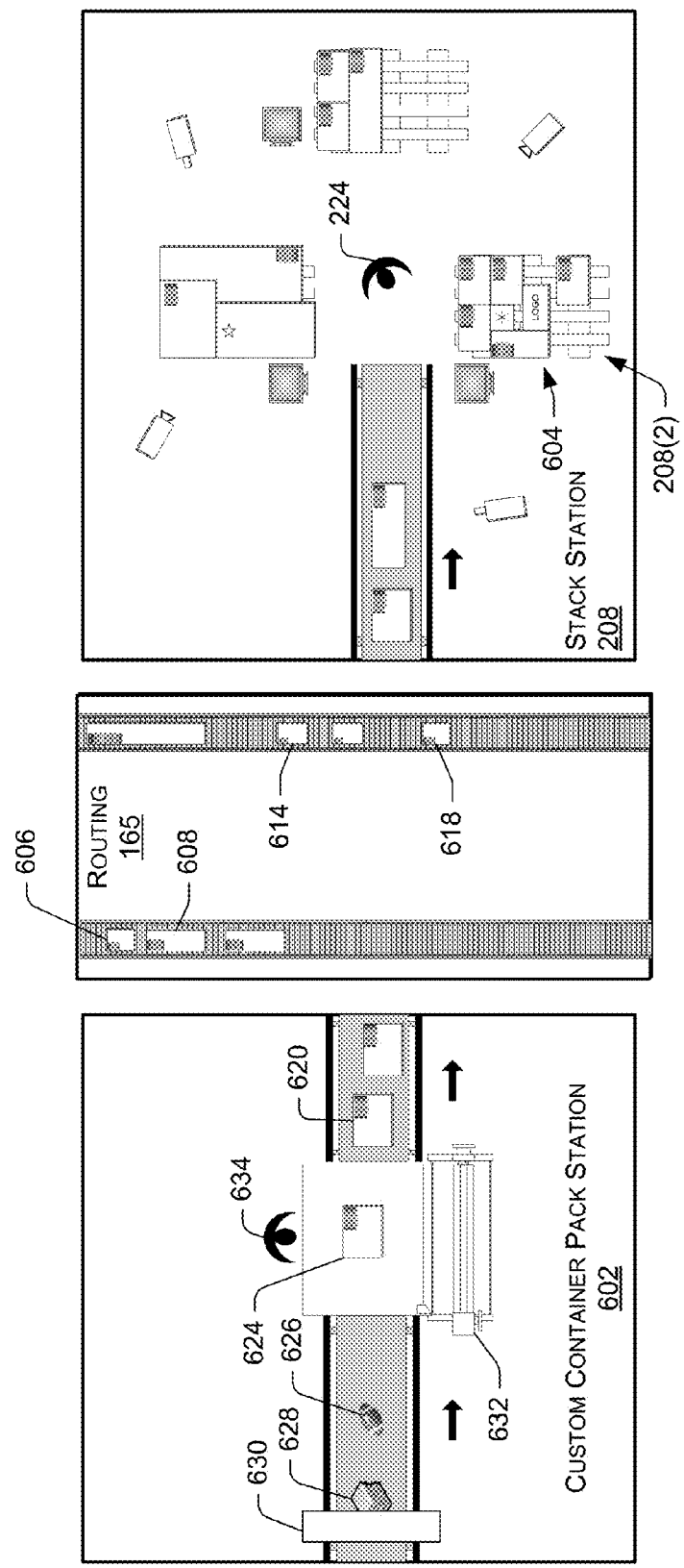
FIG. 6 illustrates a broad view of a custom container pack station and a stack station within a materials handling facility, in one implementation.

FIG. 6 illustrates a partial view of the custom container pack station 602, routing operations 165 and a stack station 208. In some implementations, when planning a stacking configuration for a transportation unit 208(2), the stacking engine may consider the stacked containers 604 and other containers or ordered items in the materials handling facility that will be shipped to the same destination. For example, the stacking engine may consider the containers 606, 608, 614, 618 in routing operations 165, standard containers (not shown) that are being packed at one or more standard pack stations (not shown), custom containers 620 that are packed and at a custom container pack station 602, custom containers 624 that are formed and being packed at a custom container pack station 602, items 626 or item packages 628 that are at or are arriving at a custom container pack station 204 for which a custom container is to be formed and/or items that have been ordered and are in the process of being picked (not shown).

In some implementations, a custom container pack station 602 may include an item dimensionalizer 630 (e.g., Cubiscan) that scans items as they arrive at the custom container pack station 602 and determines the actual dimensions of each item or item package to be packed. For item packages with multiple items to be packed in a custom container, this process may include determining the appropriate arrangement of the items for placement in a formed custom container to optimize usage of the custom container. Based on the determined configuration, an overall volume for the item package may be computed and used as the custom container dimension values for forming the custom container. In some implementations a buffer or additional volume may be added to the custom container dimension values to ensure that the item package will fit. For example, if the actual volume of the item package is determined to be 7.0 inches×4.0 inches×3.0 inches, the system may require that the custom container dimension values be at least 7.25 inches×4.25 inches×3.25 inches.

In some implementations, in addition or as an alternative to using a dimensionalizer 630, once the item package identifying the item or items to be handled are known, any estimated or known values of the dimensions (and/or volumes) of the item(s) or item package may be retrieved and a determination made as to whether those values are believed accurate (i.e., trusted). For example, estimated or known dimensions and/or volumes of various items of the item package may be retrieved from a table or database, such as Table 1, described below. The item dimensions may be estimated based on information received from a manufacturer or vendor of the items, based on a process of successive approximation as the items are handled within the facility, based on measurements taken of the item while in the facility, and the like.

If the item dimensions are not known and/or not trusted, they may be obtained using a dimensionalizer, manually measured, or otherwise approximated. Obtained item dimensions may be stored by updating or supplementing the table or database, such as Table 1. In some instances, additional items may also be planned for inclusion in the item package. For example, flyers, dunnage or other additional material may be included in a custom container.

The determined custom container dimension values may be associated with the item package and provided to a custom container forming device 632 that will form the custom container for use in packing the item package. The custom container dimension values may also be provided to the stacking engine and considered by the stacking engine when planning stacking configurations 604. For example, the stacking engine may determine that in order to plan a stable stacking configuration that includes the stacked containers 604 and the containers 606, 608, 614, 618 in routing, a container with dimension values of 12.25 inches×14.75 inches×28.0 inches is desirable. Assuming the dimension values for the custom container that will be formed for the item package 628 are 13.0 inches×13.0 inches×25.0 inches, the stacking engine may determine to modify those dimension values to match the desired dimension values and include the container in the planned stacking configuration for the transportation unit 208(2).

In other examples, the stacking engine may modify one or more dimension values for multiple custom containers and include those containers in the planned stacking configuration. For example, the stacking engine may consider the added shipping costs resulting from increasing dimension values of a custom container and determine the lowest total added shipping cost that will result from a modification of one or more dimension values of one or more custom containers. In addition to considering added shipping costs, the stacking engine may also consider the structural integrity of a custom container. In some examples, if the dimensions are expanded too far, the structural integrity of the box may suffer. For example, if the width of the box is expanded but not the height (e.g., the custom container has dimension values similar to a pizza box—20.0 inches×20.0 inches×2.0 inches), it may be subject to crushing at the center.

In still other examples, the stacking engine may consider customer expectations. If the customer has ordered a small item, there may be an upper bound on the volume of the box into which the item is to be shipped to ensure a good customer experience. In still other examples, the stacking engine may consider whether one or more items of the item package are potentially fragile and may have a higher likelihood of damage if the container volume is expanded.

In the example where a one or more dimension values of a custom container to be formed are modified by the stacking engine, the customer container may be formed according to the modified dimension values by the customer container forming device 632, the items packed in the formed customer container by a packing agent 634, routed through routing operations 165 and delivered to the stack station 208 for stacking on the transportation unit 208(1) by the stacking agent 224 according to the stacking configuration provided by the stacking engine.

Once the standard container or custom container is packed with the item package and any non-item content (e.g., dunnage, advertisements), the container may be weighed. Actual weight of a container may be used to determine the shipping costs for the container, the weight of the corrugate, whether the appropriate items are contained in the container, to confirm that the container has been placed in the proper stack quadrant of a transportation unit as part of stacking, etc. The estimated weight for the container may be based on, for example, the estimated or known weight for each item of the item package, the density and calculated weight of the corrugate, and the weight of any non-item content. Alternatively, the actual weight may be compared to the actual weight of the same item package previously packaged and shipped in either a custom container or a standard container.

Figure 7B:
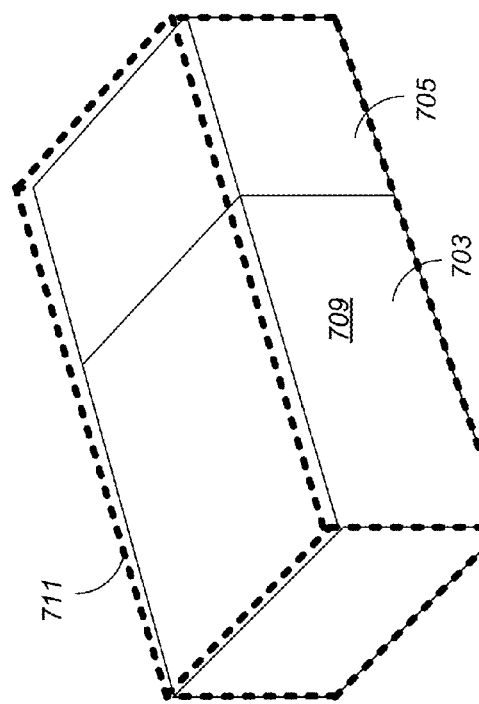
FIG. 7B is a block diagram of a custom container containing items.
Figure 7A:
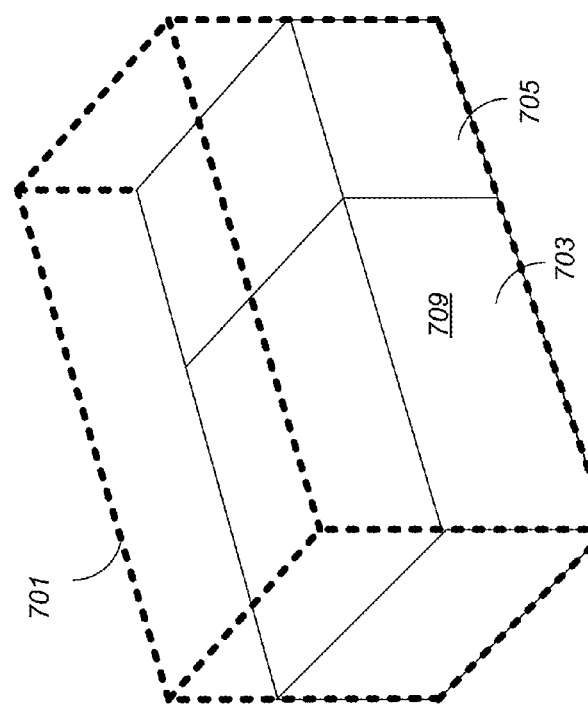
FIG. 7A is a block diagram of standard container containing items.

FIGS. 7A-7B illustrate examples of a how a container recommendation service may select a standard container 701 to recommend for shipping an item package 709 of two items 703, 705 and determine custom container dimension values to recommend for forming a custom container 711 for shipping the same item package 709 of two items 703, 705 (FIG. 7B). In some embodiments, the container recommendation service may be configured to recommend various containers suitable for shipping the item package 709 based on item dimension values currently associated with the items 703, 705 of the item package 709 and/or dimensions associated with the item package 709 itself. For example, the container recommendation service may recommend a particular container suitable for shipping an item package 709 based on known or estimated dimension values of the items 703, 705 in the item package 709 (e.g., item dimension values provided by the vendors of each of the items, measured by agents or systems in the facility, and/or estimated as described herein). In one embodiment, the container recommendation service may base its decision on item dimensions gathered through a dimensionalizer, and may have a fairly high level of accuracy. In other embodiments, the item dimensions used in recommending a container may be estimated based on information received from a manufacturer or supplier of the items, or based on a process of successive approximation as the items are handled within the facility. In many cases, knowing the exact dimensions of an item may not be necessary for selecting a standard container or custom container dimensions into which a group of items can be placed, because the "practical" or estimated dimensions of the items may provide a size range accurate enough to select a standard container from among a finite set of containers or form a custom container within a percentage of dimension tolerance to ensure that the items of the item package will fit.

In some embodiments, the container recommendation service may make particular assumptions about item dimensions or may assign item dimensions according to a standard algorithm, or company policy, in order to facilitate the recommendation of containers for item packages. For example, in one embodiment, the item dimension having the largest value may be designated to be the "length," the dimension having the second largest value may be designated to be the "height," and the dimension having the smallest value may be designated to be the "width" of the item. In such embodiments, the dimensions of containers may also be designated using the same assumptions. In other embodiments, different assumptions or assignments may be made or the designation of length, height, and width dimensions of items or containers may be arbitrary. In some embodiments, standards or policies may specify other aspects of the operations of the materials handling facility, such as a default placement for certain items within containers or a specific bin-packing algorithm to be assumed when recommending containers and/or estimating the cube utilization of an item or group of items if placed in a particular candidate container. For example, various policies may specify that the largest (and/or heaviest) item in a group should be placed horizontally along the bottom of the container and smaller items placed on top of the larger items.

As noted above, known and/or estimated item dimension values may be used to identify standard containers 701 whose volume and/or dimensions are appropriate for handling the item package 709. In addition, in some embodiments, the dimension values and/or volume of the packaging materials and any other non-item contents may also be considered when recommending a standard container 701 for the item package 709 or a custom container 711 for the item package 709. For example, the item package 709 dimensions and promotional inserts, fill material dimensions and/or gift wrapping may be supplied to the container recommendation service as an input and may be used in determining the appropriate standard container and custom container dimension values for collectively handling the item package and non-item contents.

In one embodiment, the volume of an item package 709 may be defined to be equal to the volume of a three-dimensional bounding box having length, width, and height equal to the length, width, and height of the items contained in the item package when arranged for packing, and the volume of a container may be defined to be the maximum volume of the interior of the container. In some embodiments, the volume and dimensions of a group of items may be defined, respectively, to be the volume and corresponding dimensions of a three-dimensional bounding box having sufficient length, width, and height to contain all of the items in the item package. For example, in FIG. 7A, a container recommendation may be determined using a particular packing algorithm that calculates the volume of a bounding box surrounding the items 703, 705. This may be done according to guidelines and conventions for packing one or more items (e.g., the packing algorithm may specify that the largest and/or heaviest item should be placed horizontally on bottom of the container first and additional items may be placed on top of, or next to, this item in order of their largest dimension value, their weight, etc.). In another embodiment, the system may be configured to calculate a volumetric utilization (e.g., the percentage of the container that would be filled by the item(s) and any non-item contents) for the item(s) when placed in containers of various sizes and shapes.

Based on the calculated volumetric utilization of the item package, the system may then recommend a standard container 701 that is available within the fulfillment center that will maximize the volumetric utilization and recommend custom container dimension values for use in forming a custom container 711 (FIG. 7B) that maximizes volumetric utilization. In FIG. 7B, the custom container 711 has dimensions that are large enough to ship the item package 709. In one example, the dimensions of the custom container 711 may be slightly larger than the calculated dimensions of the item package 709 to ensure that the agent packing the custom container 711 with the items 703, 705 has sufficient room for the items 703, 705 or to account for item dimensions that may not be precise. In other implementations, the custom container dimension values may include added volume dimensions added by the stacking engine to improve the stability of a stacking configuration that will include the custom container.

While the examples contained herein use the definitions described above, other embodiments may use other definitions of volume and/or volumetric utilization, or may not use a determination of volume or volumetric utilization as part of a container recommendation process.

Figure 8:
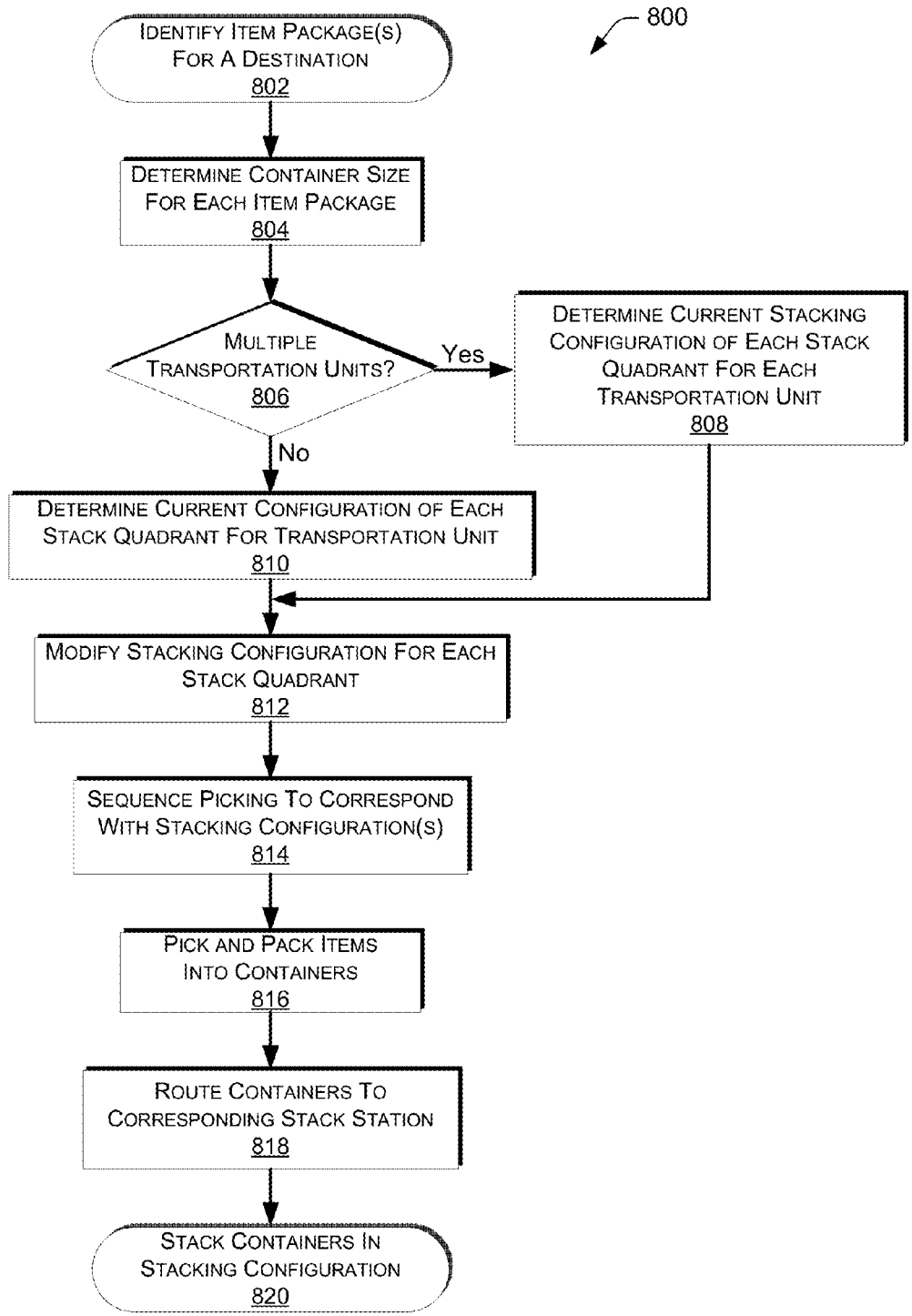
FIG. 8 is a flow diagram illustrating an example process for sequencing the picking of items to correspond with a stacking configuration for one or more transportation units.

FIG. 8 is a flow diagram illustrating an example process for sequencing the picking of items to correspond with a stacking configuration for one or more transportation units. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 800 begins by identifying one or more item packages for a destination, as in 802. As discussed above, a destination may be the final destination for delivery of the item package, or an interim destination to which the item package will be delivered upon leaving a materials handling facility. For example, a destination may be another materials handling facility through which the item package will be shipped before reaching its final destination. For each identified item package, a container size into which the item package will be packed is determined, as in 804.

In addition to determining the container size for each item package, the example process 800 may determine if there are multiple transportation units within the materials handling facility scheduled for delivery to the destination, as in 806. If it is determined that there are multiple transportation units scheduled for delivery to the same destination, the current configuration of each stack quadrant for each of those transportation units may be determined, as in 808. In one implementation, each transportation unit may have the same number of stack quadrants. Alternatively, different transportation units may have a different number, shape and/or size of stack quadrants. For example, some transportation units scheduled for delivery to the same destination may only have one stack quadrant and others may have four stack quadrants. For each stack quadrant on each transportation unit, the current stacking configuration is determined, as in 808. This may include, identifying stacked containers already located on or in the transportation unit and/or the planned placement of containers currently in route to the transportation unit. If it is determined that there are not multiple transportation units scheduled for delivery to the destination, a current stacking configuration of the stack quadrant(s) for a single transportation unit scheduled for delivery to that destination may be determined, as in 810.

Upon determining the current configuration for each identified stack quadrant, the example process 800 may plan a stacking configuration (if none exists) or modify an existing stacking configuration to include the one or more containers containing the item packages identified at block 802, as in 812. For example, the example process 800 may determine the dimension values of each identified container and process through each current stack stacking configuration for each identified stack quadrant and identify a position within one of the identified stack quadrants for the containers that will result in a stable stacking configuration. Such planning may include altering the previously planned stacking configuration for a stack quadrant or selecting one of the identified containers for positioning and placement on top of the other stacked and/or planned containers for a stack quadrant.

Upon identifying the stacking configuration for each stack quadrant to include the item packages identified by the example process 800, the sequencing of picking of the items for those item packages may be determined and planned such that it will correspond with the order in which the containers should be stacked in each stack quadrant, as in 814. For example, items to be packed into a container that is to be placed first onto a stack quadrant will be planned for picking first. Items to be packed in a container that will be placed on top of that item package will be planned for later picking.

As items are sequenced for picking, the example process 800 may provide instructions to one or more picking agents within the materials handling facility to pick orders from stock inventory and deliver those orders to one or more pack stations within the materials handling facility, as in 816. In some implementations, multiple pick agents and multiple pack stations may be utilized in the materials handling facility such that items of identified item packages may be picked and/or packed in parallel. As items are picked, they may be sorted into their corresponding item packages prior to delivery to a pack station for packing into a container. In addition, during sorting, one or more items and/or item packages may be re-sequenced to correspond with the sequence planned above at block 814. Alternatively, as all items for an item package are picked they may be provided to a pack station and packed into a container. The packed container may be temporarily held at the pack station until it is ready to be delivered in sequence to a stack station along with other containers in the planned sequence. Alternatively, as items are packed into containers, those containers may be delivered directly to a planned stack station, as in 818.

Regardless of whether the containers containing the identified item packages are sequenced during picking, sequenced at sorting, sequenced at packing, and/or delivered directly to a stack station, as containers arrive at the stack station, instructions may be provided to one or more stacking agents to stack the containers according to the planned stacking configuration, as in 820.

Figure 9:
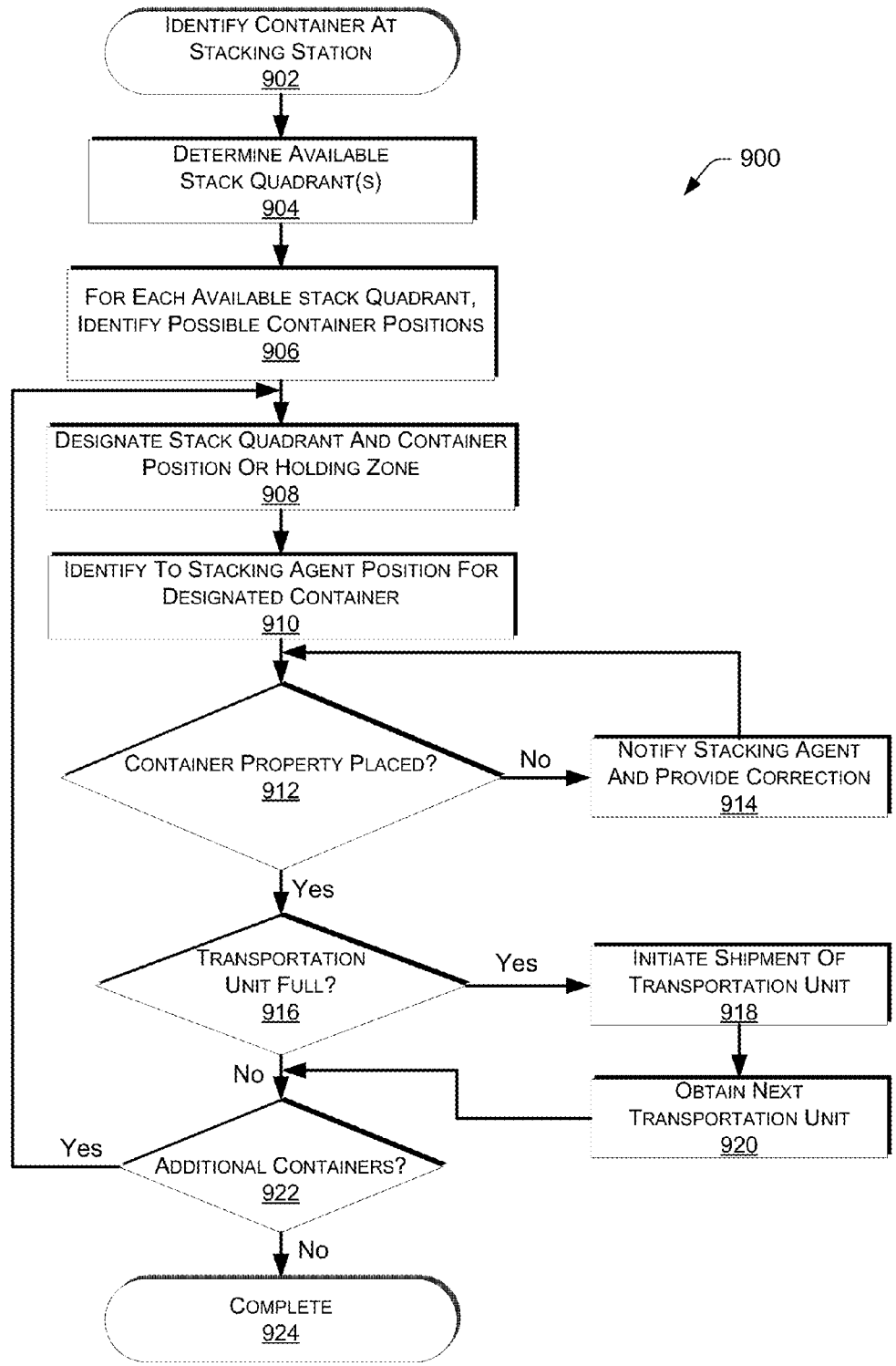
FIG. 9 is a flow diagram illustrating an example process for dynamically planning a stacking configuration for containers at a stack station.

FIG. 9 is a flow diagram illustrating an example process 900 for planning a stacking configuration for containers at a stack station. The example process 900 begins upon identifying a container at a stack station, as in 902. For the identified container, available stack quadrants may be identified, as in 904. Available stack quadrants may be all unfinished stack quadrants on transportation units within the stack station that are scheduled for delivery to the same destination as the container. Upon determining the available stack quadrants, possible stacking configurations for the available quadrants may be determined, as in 906. Determining stacking configurations may include determining multiple stacking configurations for each available stack quadrant. For example, every possible position of the container at each stack quadrant may be determined. In addition to considering the identified container when planning different potential stacking configurations, other containers arriving at the transportation unit that are scheduled for delivery to the same destination may also be considered. In addition, historical information may be used to predict what other containers, and their dimension values, are likely to be associated with the transportation unit.

Based on the different possible placements of the identified container within the available stack quadrants, a determination is made as to which placement(s) in which stack quadrant(s) will provide a stable stacking configuration. In some examples, more than one stack quadrant and/or more than one position within a stack quadrant may offer a stable stacking configuration when the container is added. In such an example, an available quadrant and/or position may be randomly selected, or other factors may be considered. For example, the status of the overall transportation unit(s) may be considered when selecting from multiple possible stack quadrants. If there are multiple transportation units onto which the container may be stacked that will provide a stable stacking configuration, the transportation unit closest to being fully stacked may be selected. In other implementations, the transportation unit with the fewest containers may be selected. If multiple positions within a selected stack quadrant will provide a stable environment, the position may be randomly selected. Alternatively, dimension values for additional containers that may be placed in the stack quadrant may be considered. In other implementations, if there is no stack quadrant that will provide a stable environment when the container is added, or if planned containers onto or into which the current container will be placed have not been stacked, a temporary holding zone within the stack station may be designated for the container.

Regardless of the process used, a stack quadrant and position for the container or the selection of a temporary holding zone may be designated for the container, as in 908. Upon designating a stack quadrant and a position for the container, the example process 900 may identify the container to a stacking agent and identify to the stacking agent a transportation unit, stacking quadrant, and position where the container is to be placed, as in 910. Alternatively, if is determined at block 908 that the container is to be placed in a temporary holding zone, the example process 900 may identify the container to a stacking agent and identify that the container is to be placed in a temporary holding zone within the stack station.

Upon placement of the container at the identified position within a stack quadrant, a determination may be made as to whether the container was properly placed, as in 912. As discussed above, a variety of techniques may be used to determine whether a container has been properly placed. For example, a camera within the materials handling facility may capture one or more images of the container placed on a transportation unit and perform image analysis to confirm that the container is properly positioned on the transportation unit. Alternatively, RFID may be used to identify the container. In other examples, infrared signals may be emitted and a time of flight determined for the return of the signals after they reflect off the containers on the transportation unit to generate a three-dimensional representation of the containers on the transportation unit. From that three-dimensional representation, a determination may be made as to whether the container has been properly placed on the transportation unit.

Regardless of the technique used, if it is determined that the container has not been properly placed on the transportation unit, the stacking agent may be notified that the container has been improperly placed and corrective instructions may be provided to the stacking agent to remedy the inaccuracy, as in 914. For example, the correct placement of the container may be projected onto the transportation unit to aid the stacking agent in correctly orienting and positioning the container. Alternatively, a display may be used to provide a graphical representation to the stacking agent as to the appropriate placement of the container on the transportation unit. Upon providing notification to the stacking agent to correct the inaccurate placement of the container, the example process 900 returns to decision block 912 and continues.

As noted above, a stacking agent may also specify, or it may otherwise be determined, that the container does not match the expected dimension values. In such an example, the stacking configuration may be re-planned. This may include re-planning the stacking configuration and including the container based on actual dimension values or removing the container and re-planning the stacking configuration without the container.

If it is determined that the container has been properly placed on the transportation unit or upon correction of an improperly placed container onto the transportation unit, the example process 900 may determine if each quadrant of the transportation unit is complete and the transportation unit full, as in 916. If it is determined that each stack quadrant of the transportation unit is complete and the transportation unit is full, shipment of the completed transportation unit may be initiated, as in 918. In addition to initiating shipment of the transportation unit, the example process 900 may also provide another transportation unit to the stack station, designate one or more stack quadrants for the newly added transportation unit and specify a delivery destination for the newly added transportation unit, as in 920. The newly added transportation unit may then be considered when determining a stack quadrant for future containers scheduled for delivery to the destination specified for the newly added transportation unit.

If it is determined that the each quadrant of the transportation unit is not complete, or upon obtaining an additional transportation unit, the example process 900 may determine whether there are additional containers arriving at the stack station to be stacked, as in 922. If it is determined and that additional containers are arriving at the stack station, the example process 900 returns to block 908 and continues. However, if it is determined that there are no additional containers, the example process 900 completes, as in 924.

Figure 10:
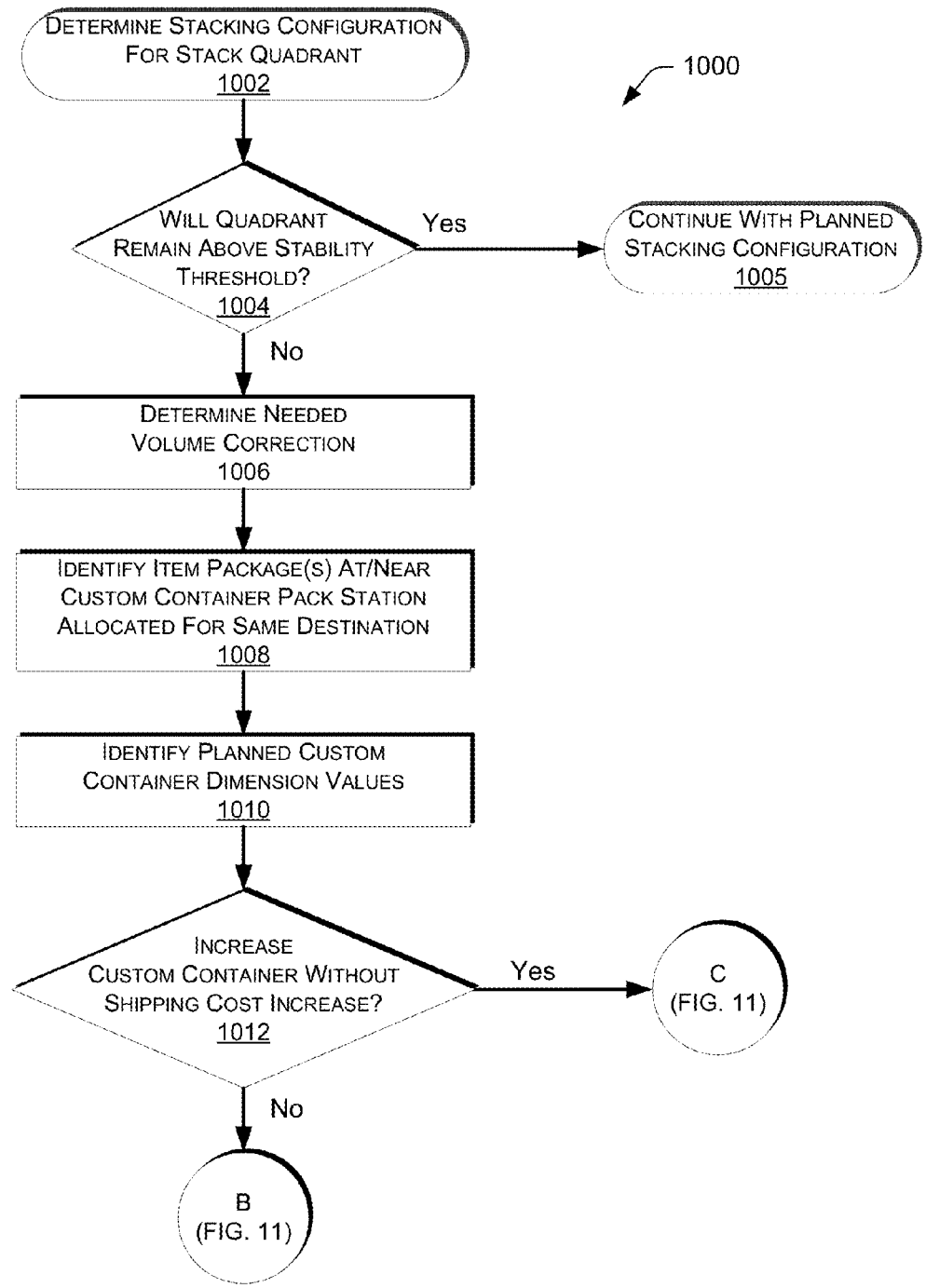
FIGS. 10-11 is a flow diagram illustrating an example process for modifying a custom container.
Figure 11:
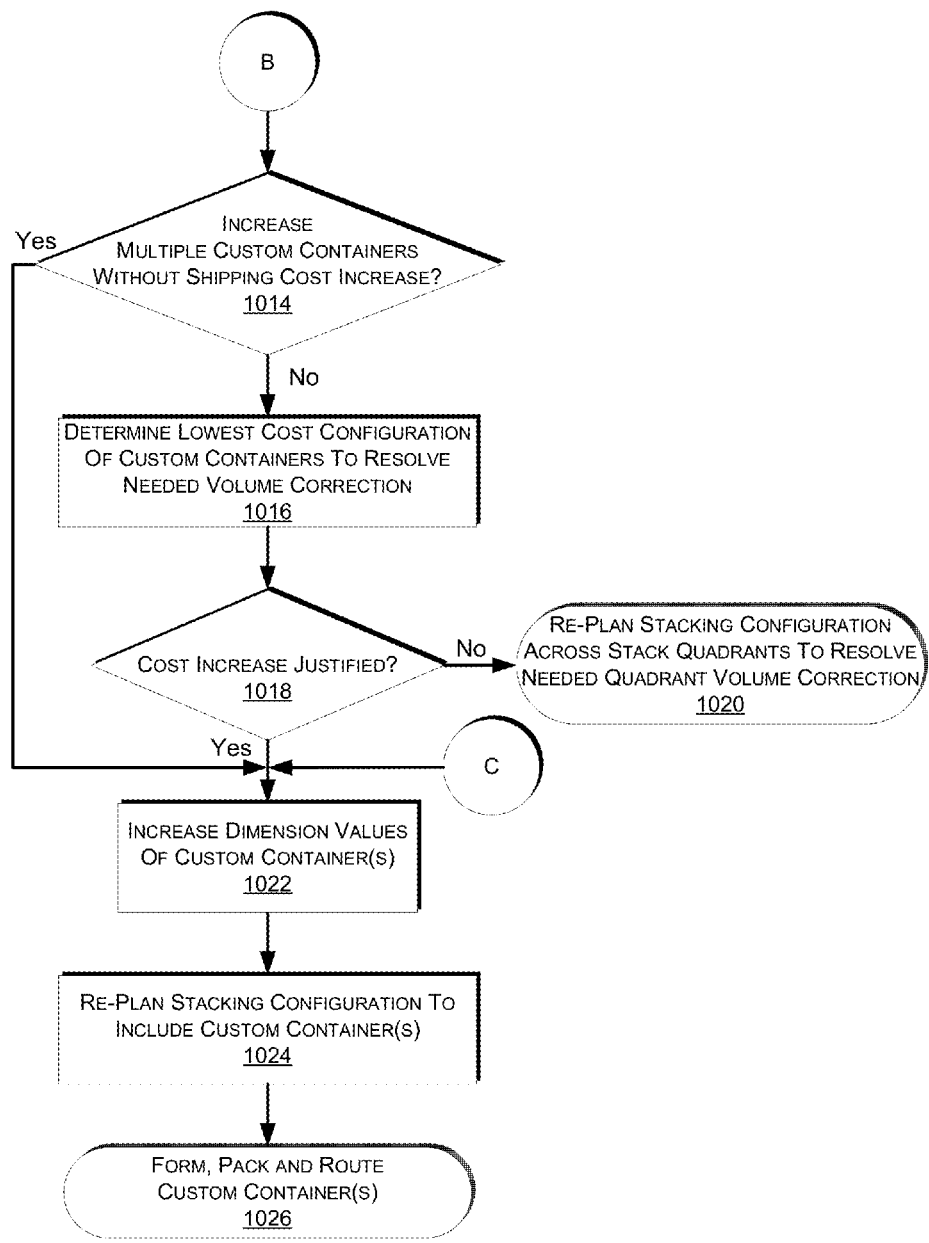

FIGS. 10-11 is a flow diagram illustrating an example process for modifying a custom container for planning a stacking configuration. The example process 1000 begins by determining a stacking configuration for a stack quadrant of a transportation unit, as in 1002. As discussed above, a stacking configuration for a stack quadrant may be determined by considering currently stacked containers in that stack quadrant, containers in routing that are scheduled for delivery to the same destination as the transportation unit of that stack quadrant, containers at one or more pack stations scheduled for delivery to the same destination, ordered items to be packed in a container scheduled for delivery to the same destination, and item packages at one or more custom container pack stations for which a custom container has not yet been formed.

Upon determining a stacking configuration for a stack quadrant, a determination is made as to whether the quadrant will remain above the stability threshold when the containers are stacked, as in 1004. A stability threshold may be any predetermined factor that is considered when planning a stacking configuration. For example, the threshold may be the amount of force that would need to be applied to the stack quadrant in one or more directions to cause a container of the stack quadrant to move and/or fall off of the stacking configuration. In other implementations, rather than a stability threshold, a determination may be made as to whether a minimum number of containers and/or minimum total container volume can be stacked in the stack quadrant. Alternatively, the stability threshold may be based on the number of supports for each container. For example, the stability threshold may specify that each container is to be supported by at least three points when stacked and center of gravity for the container needs be within the triangle defined by those three points.

If is determined that the stack quadrant will remain stable when stacked, the example process 1000 maintains the planned stacking configuration and completes, as in 1005. However, if is determined that the stack quadrant will not remain above the stability threshold, the example process 1000 may determine a needed volume correction for the stack quadrant, as in 1006. The volume correction may represent a distance in one or more directions that needs to be added to the stacking configuration such that when the containers are stacked the stacking configuration will remain stable. For example, if the currently available containers are planned in a stacking configuration that would result in a top surface not having a sufficient amount of level area to allow stacking of an additional container, a determination may be made as to the additional volume that, if added to the stacking configuration, would provide a larger level surface area. For example, if one of the containers could be increased in volume by adding two inches to the height such that the total top surface of the stacking configuration would have a larger surface area, the needed volume may be the increased two inches in height times the current length and width of the container.

Upon determining the needed volume correction, the example process 1000 may identify one or more item packages at or near a custom container pack station that are allocated for the same destination as the transportation unit but for which a custom container has not yet been formed, as in 1008. For each of the identified item packages at or near the custom container pack station, the currently planned dimension values for the custom containers into which those item packages are to be packed may be identified, as in 1010, and a determination may be made as to whether one or more of those dimension values may be increased without increasing a shipping cost for that custom container, as in 1012. For example, the shipping cost may be determined based upon total volume of a container. In some implementations, one or more dimension values of a custom container may be increased and one or more dimension values of the same custom container decreased such that the total volume of the container remains unchanged and the item package may still be contained in the custom container. In addition, in some implementations, the total volume of a container may be increased in small amounts without increasing the shipping cost.

If is determined that a single custom container cannot be increased without increasing the shipping cost of the custom container, a determination may be made as to whether multiple custom containers may be modified that will collectively satisfy the needed volume correction without increasing shipping cost of any of the multiple custom containers, as in 1014 (FIG. 11). If it is determined that neither a single container nor multiple custom containers can be modified without increasing the shipping costs, the example process 1000 may determine a lowest cost configuration of custom containers that when modified will resolve the needed volume correction, as in 1016. For example, different combinations of custom container dimension value corrections may be analyzed to determine a lowest total shipping cost increase that will also result in the needed volume correction for the stacking configuration. In addition to considering lowest total shipping costs, in some implementations, other factors may be considered before adjusting one or more dimension values of one or more custom containers. For example, the type of items being shipped (e.g. fragile, liquid) may be considered before adjusting a dimension value of a custom container. In addition, customer satisfaction may also be considered before dimensions values of one or more custom containers are modified. The overall cube utilization of the containers may also be considered when determining a lowest cost configuration.

Once the lowest shipping cost increase has been identified, a determination is made as to whether the shipping cost increase is justified, as in 1018. For example, if the stability of the quadrant will only allow for one additional container before the stack quadrant is full but the increased shipping cost is $4.00, that increased shipping cost may be compared against the cost of shipping that one additional container via a different transportation unit and/or via a different stack quadrant of that transportation unit. If the cost to ship the one additional container via a different transportation unit or a different stack quadrant of the transportation unit is less than $4.00, it may be determined that the cost increase is not justified. In such an instance, the stack configuration for the stack quadrant may be modified such that the containers, when stacked, will remain stable without adding or modifying a custom container, as in 1020.

If it is determined that the increased shipping cost is justified, the one or more dimension values of the one or more custom containers may be modified, as in 1022 and the stacking configuration for the stack quadrant re-planned to include the custom container(s), as in 1024. In addition to re-planning the stacking configuration to include the custom containers, custom containers may be formed, the item packages packed in those custom containers, and the custom containers added to the routing process and delivered to the appropriate stack station, as in 1026.

A packaging information system that includes a stacking engine for planning stacking configurations may be further described using the following example. In this example, an e-commerce organization sells items of various types that can be shipped to customers or otherwise stored. Five example items are shown in an item parameter data store, in Table 1, below. In this example, the entry for each item includes a corresponding unique identifier, name, and type in columns 1-3. The item parameter data store also includes columns for storing values for various physical parameters of each item (columns 4-6), which in this example includes the item height, length, and width.

TABLE 1

| item ID | item name | item type | item height (in) | item length (in) | item width (in) |
|---------|-----------|-----------|------------------|------------------|-----------------|
| 4982 | book1 | book | 8.40 | 6.40 | 2.59 |
| 4325 | book2 | book | 8.29 | 6.40 | 2.59 |
| 2309 | plate38 | plate | 0.92 | 9.40 | 9.40 |
| 0873 | shoe17 | shoe | 14.00 | 8.00 | 6.54 |
| 1832 | DVD1 | DVD | 7.48 | 5.31 | 0.55 |

While not shown, in other embodiments, additional information may be stored in an item parameters data store, such as the volume or weight of the item, a confidence level for the item dimension values, information on statistical variances in the dimension values, whether the item has been designated to receive special damage protection, or other indications of allowable deviations from the dimension values. In some embodiments, a manufacturer, supplier or vendor may provide item dimensions for the items shown in Table 1. In other embodiments, the item dimension values may be values measured automatically or by agents in the facility, or may be values that have been estimated based on various containers in which the items have been handled. These dimension values may be used to recommend a standard container and/or recommend custom container dimension values for use in forming a custom container in which each item may be packaged, either alone or along with other items in an item package.

In some embodiments, dimension values and/or other parameter values for the standard containers may be stored in one or more tables, databases, or other data structures, such as the container parameters data store illustrated in Table 2 below. In this example, a standard container identifier, a standard container name, and a standard container type are stored in each entry of Table 2 in columns 1-3. Dimension values for various standard containers are shown in columns 4-6. In some embodiments, a manufacturer, supplier or vendor of a standard container may provide the values of various standard container parameters, including container dimensions. In other embodiments, standard container parameters may be determined by measuring one or more instances of the standard container.

In this example, the available standard containers include three types of boxes in which items may be.

TABLE 2

| container ID | container name | container type | height (inches) | length (inches) | width (inches) |
|---|---|---|---|---|---|
| 413 | smallbox1 | box | 19.0 | 13.0 | 11.75 |
| 293 | smallbox2 | box | 22.0 | 18.0 | 11.75 |
| 338 | bigbox1 | box | 24.0 | 16.0 | 16.00 |

In the example illustrated by Table 2, the values for the height, length, and width are shown for each standard container. In some embodiments, a manufacturer or supplier may provide the volume along with the dimensions, while in other embodiments, the packaging information system may calculate the volume from supplied or measured dimensions. In some embodiments, additional information regarding various standard containers (e.g., the weight or volume of the standard containers, a strength rating, or an indication of protective packaging materials or filler to be used in preparing items for shipment in the standard containers) may be maintained in a standard container parameters data store. In general, such a data store may include the values of more, fewer, or different parameters than those illustrated in Table 2.

In some embodiments, the packaging information system may store recommended and actual container dimensions (standard or custom) used for item packages in a table, database, or other data structure, such as Table 3 below, and may use this information to analyze various packaging related operations in the materials handling facility and/or to plan a stacking configuration. In this example, Table 3 illustrates a package parameters data store, in which each entry (row) includes information about actual versus recommended containers for item packages used for shipping items to customers.

In this example, each entry includes a list of the container contents (e.g., the contents of an item package) along with the number of copies of each item included in the item package, and the identifiers of both the recommended container and the actual container used to package and ship the item package. For example, in Table 3, column 3 is used to store the name of the standard container recommended or the custom container dimension values recommended for a custom container. Column 4 is used to store the name of the actual standard container used to handle each item package or the dimension values actually used to form a custom container. In other embodiments, the dimensions of the standard containers may be used instead of the names. In this example, columns 5-6 may be used to store customer feedback for an item package shipment (e.g., customer ratings for damage and container size, respectively), and column 7 may be used to store agent feedback for the item package shipment (e.g., too small, too large).

In some embodiments, additional information may be stored in a package parameters data store, such as customer concessions, whether the stacking engine added dimension value(s) to the custom container, a date or timestamp for each entry or a batch number or other identifier of specific item or item group instances (not shown). In other embodiments, more, fewer or different parameters may be stored in a package parameters data store, or similar information may be stored in other combinations in one or more other tables, databases, or other data structures.

TABLE 3

| package ID | package contents | rec. cont. | actual cont. | damage rating | size rating | Agent feedback |
|---|---|---|---|---|---|---|
| 872093 | plate38 | smallbox2 | smallbox2 | poor | fair | too big |
| 832189 | book1 × 3, book2 × 4, book3 × 7 | 7" × 6" × 4" | 7" × 6" × 4" | excellent | good | good |
| 098731 | book2 × 12, DVD1 × 2 | smallbox1 | smallbox2 | excellent | poor | too small |
| 631248 | book1 × 4 book2 × 8 shoe17 × 3 | 17" × 10" × 8" | 17" × 10" × 8" | excellent | good | good |

Various operations of a packaging information system, such as those described herein, may be executed on one or more computer systems, interacting with various other devices in a materials handling facility, according to various embodiments. One such computer system is illustrated by the block diagram in FIG. 12. In the illustrated embodiment, a computer system 1200 includes one or more processors 1210A, 1210B through 1210N, coupled to a non-transitory computer-readable storage medium 1220 via an input/output (I/O) interface 1230. The computer system 1200 further includes a network interface 1240 coupled to an I/O interface 1230, and one or more input/output devices 1250. In some embodiments, it is contemplated that a packaging information system may be implemented using a single instance of the computer system 1200, while in other embodiments, multiple such systems or multiple nodes making up the computer system 1200 may be configured to host different portions or instances of a packaging information system. For example, in one embodiment, some data sources or services (e.g., capturing actual container information) may be implemented via one or more nodes of the computer system 1200 that are distinct from those nodes implementing other data sources or services (e.g., recommending a container for an item package). In some embodiments, a given node may implement the functionality of more than one component of a packaging information system.

In various embodiments, the computer system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various embodiments the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various embodiments, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within the non-transitory computer-readable storage medium 1220 as program instructions 1225 and data storage 1235, respectively. In other embodiments, program instructions and/or data may be received, sent or stored upon different types of computer-accessible media, such as non-transitory media, or on similar media separate from the non-transitory computer-readable storage medium 1220 or the computer system 1200. Generally speaking, a non-transitory, computer-readable storage medium may include storage media or memory media such as magnetic or optical media, e.g., disk or CD/DVD-ROM coupled to the computer system 1200 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one embodiment, the I/O interface 1230 may be configured to coordinate I/O traffic between the processors 1210A-1210N, the non-transitory computer-readable storage medium 1220, and any peripheral devices in the device, including the network interface 1240 or other peripheral interfaces, such as input/output devices 1250. In some embodiments, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some embodiments, the I/O interface 1230 may include support for devices attached through various types of peripheral buses, such as a variant of the Peripheral Component Interconnect (PCI) bus standard or the Universal Serial Bus (USB) standard, for example. In some embodiments, the function of the I/O interface 1230 may be split into two or more separate components, such as a north bridge and a south bridge, for example. Also, in some embodiments, some or all of the functionality of the I/O interface 1230, such as an interface to the non-transitory computer-readable storage medium 1220, may be incorporated directly into the processors 1210A-1210N.

The network interface 1240 may be configured to allow data to be exchanged between the computer system 1200 and other devices attached to a network, such as other computer systems, or between nodes of the computer system 1200. In various embodiments, the network interface 1240 may support communication via wired or wireless general data networks, such as any suitable type of Ethernet network. For example, the network interface 1240 may support communication via telecommunications/telephony networks such as analog voice networks or digital fiber communications networks, via storage area networks such as Fibre Channel SANs, or via any other suitable type of network and/or protocol.

Input/output devices 1250 may, in some embodiments, include one or more displays, projection devices, audio output devices, keyboards, keypads, touchpads, scanning devices, voice or optical recognition devices, or any other devices suitable for entering or retrieving data by one or more computer systems 1200. Multiple input/output devices 1250 may be present in the computer system 1200 or may be distributed on various nodes of the computer system 1200. In some embodiments, similar input/output devices may be separate from the computer system 1200 and may interact with one or more nodes of the computer system 1200 through a wired or wireless connection, such as over the network interface 1240.

Figure 12:
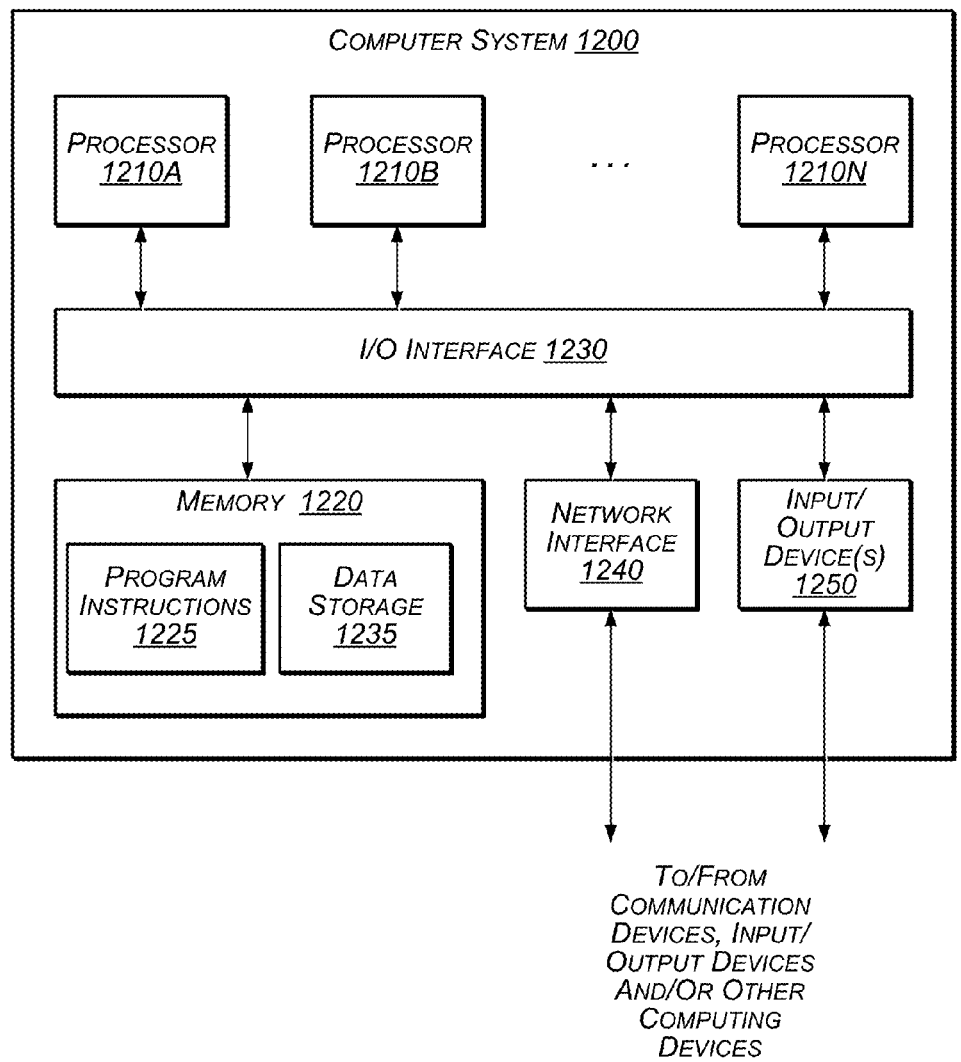
FIG. 12 is a block diagram illustrating an example computer system configured to implement one or more of the stacking and/or packing related operations described herein.

As shown in FIG. 12, the memory 1220 may include program instructions 1225 which may be configured to implement a packaging information system and data storage 1235, which may comprise various tables, databases and/or other data structures accessible by the program instructions 1225. In one embodiment, the program instructions 1225 may include various software modules configured to implement a stacking engine, a product dimension estimator, a product dimension correction system, a planning service, a container recommendation service (which may include or make use of a specialty packaging service), a transportation costing service, and/or a package performance analyzer. The data storage 1235 may include various data stores for maintaining one or more protected item lists, data representing physical characteristics of items and/or other item parameter values (such as those illustrated as being stored in Table 1), standard container parameter values (such as those illustrated as being stored in Table 2), item package information (such as those illustrated as being stored in Table 3), shipping reports (not shown), actual or expected shipping costs, avoidable shipping costs, package performance reports, etc. The data storage 1235 may also include one or more data stores for maintaining data representing delivery related feedback, such as customer ratings, experiences and the like.

In various embodiments, the parameter values and other data illustrated herein as being included in one or more data stores may be combined with other information not described or may be partitioned differently into more, fewer, or different data structures. In some embodiments, data stores used in a packaging information system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up a packaging information system and/or any of the various components thereof described herein.

Users may interact with the packaging information system (and/or various components thereof) in various ways in different embodiments, such as to automatically measure and/or manually specify measured dimension values for items and/or packaging, to specify and/or modify thresholds to be used when determining suspect item dimensions, or to specify package performance reports to be generated and/or report parameters. For example, some users may have physical access to the computing system 1200, and if so, may interact with various input/output devices 1250 to provide and/or receive information. Alternatively, other users may use client computing systems to access the packaging information system and/or its constituent components, such as remotely via the network interface 1240 (e.g., via the Internet and/or the World Wide Web). In addition, some or all of the packaging information system components may provide various feedback or other general types of information to users (e.g., in response to user requests) via one or more input/output devices 1250.

Those skilled in the art will appreciate that the computing system 1200 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. The computing system 1200 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other embodiments, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the techniques described herein may be practiced with other computer system configurations.

Those skilled in the art will appreciate that in some embodiments the functionality provided by the methods and systems discussed above may be provided in alternative ways, such as being split among more software modules or routines or consolidated into fewer modules or routines. Similarly, in some embodiments, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered. The various methods and systems as illustrated in the figures and described herein represent example embodiments. The methods and systems may be implemented in software, hardware, or a combination thereof in other embodiments. Similarly, the order of any method may be changed and various elements may be added, reordered, combined, omitted, modified, etc., in other embodiments.

From the foregoing, it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory computer-readable storage medium storing executable instructions for planning a stacking configuration for a transportation unit, the executable instructions when executed by a processor causing the processor to at least:
    identify, using a projection device, a container to be stacked on the transportation unit, wherein the container is identified by the projection device visually identifying or highlighting the container for a stacking agent;
    plan a position in the stacking configuration for the container;
    provide instructions for placement of the container on the transportation unit according to the planned position in the stacking configuration; and
    confirm a placement of the container on the transportation unit corresponds with the planned position of the container in the stacking configuration for the transportation unit.

2. The non-transitory computer readable storage medium of claim 1, the executable instructions when executed by the processor further causing the processor to at least:
    notify the stacking agent if the placement of the container is not confirmed; and
    provide instructions to the stacking agent to correct the placement of the container.

3. The non-transitory computer readable storage medium of claim 1, wherein the container is identified as it arrives at a stack station associated with the transportation unit.

4. The non-transitory computer readable storage medium of claim 1, wherein the instructions for placement of the container include instructions to place the container in a temporary holding zone.

5. The non-transitory computer readable storage medium of claim 1, wherein the instructions for placement of the container include instructions to place the container at the planned position in the stacking configuration.

6. The non-transitory computer readable storage medium of claim 1, wherein the instructions for placement of the container are provided to the stacking agent using at least one of a display, a projection device or an audio output device.

7. The non-transitory computer readable storage medium of claim 1, the executable instructions when executed by the processor further causing the processor to at least:
route the container to the transportation unit.

8. The non-transitory computer readable storage medium of claim 7, wherein the container is placed in a temporary holding zone as it is routed to the transportation unit.

9. The non-transitory computer readable storage medium of claim 1, wherein the transportation unit is a truck.

10. The non-transitory computer-readable storage medium of claim 1, wherein the projection device is at least one of a projector, a light emitting diode, or a laser.

11. The non-transitory computer-readable storage medium of claim 1, the executable instructions that when executed by the processor cause the processor to provide instructions for placement of the container, further cause the processor to at least:
project at a location on the transportation unit an identifier to indicate to the stacking agent the planned position for the container.

12. The non-transitory computer-readable storage medium of claim 11, wherein the identifier is a representation of a physical identifier located at a position on the container.

13. The non-transitory computer-readable storage medium of claim 11, wherein the identifier is a virtual three-dimensional representation of the container at a desired position on the transportation unit.

14. A computer implemented method, comprising:
under control of one or more computing systems configured with executable instructions,
identifying, using a projection device, a container, wherein the container is identified by the projection device visually identifying or highlighting the container for a stacking agent;
presenting instructions for stacking the container on a transportation unit according to a stacking configuration, wherein the instructions include a top-down two-dimensional view of the stacking configuration; and
confirming if the container was stacked on the transportation unit according to the stacking configuration.

15. The computer implemented method of claim 14, further comprising:
if it is determined that the container was not stacked according to the stacking configuration, notifying a stacking agent.

16. The computer implemented method of claim 14, wherein confirming if the container was stacked on the transportation unit according to the stacking configuration, includes:
computing a weight added to the stacking configuration;
determining that the weight matches the weight of the container; and
determining a stacking quadrant into which the container was stacked.

17. The computer implemented method of claim 14, wherein confirming if the container was stacked on the transportation unit according to the stacking configuration, includes:
capturing an image of at least a portion of the stacking configuration, including the container;
determining from the captured image a position of the container; and
confirming that the determined position of the container corresponds with a planned position of the container in the stacking configuration.

18. The computer implemented method of claim 14, wherein the top-down two-dimensional view includes a representation of a top-level stacked container that is visually distinguished from representations of lower-level stacked containers.

19. The computer implemented method of claim 14, wherein presenting instructions for stacking the container, further includes:
presenting a position of the container, wherein the presentation of the position of the container is visually distinguished from the top-down two-dimensional view of the stacking configuration.

20. The computer implemented method of claim 19, wherein the presentation of the position of the container is visually distinguished by at least one of highlighting or visually flashing a presentation of the position of the container.

21. The computer implemented method of claim 14, wherein presenting instructions for stacking includes:
providing text-based instructions for stacking the container on the transportation unit according to the stacking configuration.

* * * * *